(12) United States Patent
Takeda et al.

(10) Patent No.: US 7,328,280 B2
(45) Date of Patent: Feb. 5, 2008

(54) PEER-TO-PEER (P2P) CONNECTION DESPITE NETWORK ADDRESS TRANSLATORS (NATS) AT BOTH ENDS

(75) Inventors: Yutaka Takeda, San Diego, CA (US); Kamal Youssef Boiri, Santee, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 870 days.

(21) Appl. No.: 10/372,218

(22) Filed: Feb. 25, 2003

(65) Prior Publication Data
US 2004/0139228 A1 Jul. 15, 2004

Related U.S. Application Data

(63) Continuation-in-part of application No. 10/342,304, filed on Jan. 15, 2003.

(51) Int. Cl.
*G06F 15/16* (2006.01)
(52) U.S. Cl. ............... 709/245; 709/249; 709/220; 709/224
(58) Field of Classification Search ............... 709/245, 709/249, 230, 225–227, 224, 220
See application file for complete search history.

(56) References Cited

U.S. PATENT DOCUMENTS

| | | | | |
|---|---|---|---|---|
| 6,393,488 | B1 * | 5/2002 | Araujo | 709/245 |
| 6,661,799 | B1 * | 12/2003 | Molitor | 370/401 |
| 6,993,012 | B2 * | 1/2006 | Liu et al. | 370/352 |
| 6,993,037 | B2 * | 1/2006 | Boden et al. | 370/401 |
| 7,042,876 | B1 * | 5/2006 | Jayasenan et al. | 370/389 |
| 2002/0075844 | A1 * | 6/2002 | Hagen | 370/351 |
| 2002/0085561 | A1 | 7/2002 | Choi et al. | |
| 2002/0114319 | A1 | 8/2002 | Liu et al. | |

(Continued)

FOREIGN PATENT DOCUMENTS

WO  WO 02/03217 A1  1/2002

(Continued)

OTHER PUBLICATIONS

"Invitation to Pay Additional Fees" for PCT/JP2004/000261 (counterpart application), mailed Dec. 7, 2004.

(Continued)

*Primary Examiner*—Philip Tran
(74) *Attorney, Agent, or Firm*—Harness, Dickey & Pierce, PLC

(57) ABSTRACT

Methods of operating a first endpoint device (ED) facilitate the making of a peer-to-peer (P2P) connection between the first ED and a second ED despite intervening network address translators (NATs) at both ends. The P2P connection extends across a system compliant with the internet protocol (IP) whose architecture that includes a first network (having at least the first ED and a first NAT), a second network (having at least the second ED and a second NAT) and a third network. The first ED connects to the third network via the first NAT while the second ED connects to the third network via the second NAT. A first such method includes: providing the second ED with the first IP-address/port pair; and providing the second ED with first type-information regarding the type of the first NAT.

3 Claims, 25 Drawing Sheets

U.S. PATENT DOCUMENTS

| | | | |
|---|---|---|---|
| 2003/0112823 A1* | 6/2003 | Collins et al. | 370/474 |
| 2003/0140142 A1* | 7/2003 | Marples et al. | 709/225 |
| 2003/0221009 A1* | 11/2003 | Standridge et al. | 709/227 |
| 2003/0225836 A1* | 12/2003 | Lee et al. | 709/205 |
| 2003/0233471 A1* | 12/2003 | Mitchell et al. | 709/249 |
| 2004/0024879 A1* | 2/2004 | Dingman et al. | 709/227 |
| 2004/0057385 A1* | 3/2004 | Roshko | 370/252 |
| 2004/0064584 A1* | 4/2004 | Mitchell et al. | 709/245 |
| 2004/0133640 A1* | 7/2004 | Yeager et al. | 709/204 |

FOREIGN PATENT DOCUMENTS

| | | |
|---|---|---|
| WO | WO 03/063444 A1 | 7/2003 |

OTHER PUBLICATIONS

J. Rosenberg, et al., "STUN-Simple Traversal of UDP Through NATs", Internet Engineering Task Force Draft, 30 pages, Mar. 1, 2002.

"The Gnutella Protocol Specification v0.4[1]", Document Revision 1.2, Clip 2, http://www.clip2.com, protocols@clip2.com, 10 pages, no date.

"SPAN-A—Candidate A for the Pre-Midcom SPAN Protocol", draft-cordell-midcom-span-a-00, Internet Engineering Task Force, Midcom WG, P. Cordell, Jun. 24, 2002, pp. 1-39.

"SDP: Session Description Protocol", rfc2327, Network Working Group, M. Handley, et al., ISI/LBNL, Apr. 1998, pp. 1-38.

"STUN—Simple Traversal of UDP Through Network Address Translators", draft-ietf-midcom-stun-02, Internet Engineering Task Force, Midcom WG, J. Rosenberg, et al., Aug. 22, 2002, pp. 1-38.

"Traversal Using Relay NAT (TURN)", draft-rosenberg-midcom-turn-00, Internet Engineering Task Force, Midcom WG, Rosenberg, et al., Nov. 14, 2001, pp. 1-16.

"NAT and Firewal Scenarios and Solutions for SIP", draft-ietf-sipping-nat-scenarios-00, Internet Engineering Task Force, Sipping WG, J. Rosenberg, et al., Jun. 24, 2002, pp. 1-55.

\* cited by examiner

|  | | Type of NAT Adjacent To Second Endpoint Device, e.g., HTTP Client (Browser) | | | | |
|---|---|---|---|---|---|---|
|  |  | Open | F | AR | PR | SYM |
| Type of NAT Adjacent To First Endpoint Device, e.g., HTTP Server | Open |  |  |  |  | III |
|  | F | I |  | II |  | IV |
|  | PR |  |  |  |  |  |
|  | PR |  |  |  |  | V |
|  | SYM |  |  |  |  |  |

*Fig-5A*

|  | | Type of NAT Adjacent To Second Endpoint Device, e.g., HTTP Client (Browser) | | | | |
|---|---|---|---|---|---|---|
|  |  | Open | F | AR | PR | SYM |
| Type of NAT Adjacent To First Endpoint Device, e.g., HTTP Server | Open |  |  |  |  | III |
|  | F | I |  | II |  | IV |
|  | PR |  |  |  |  |  |
|  | PR |  |  |  |  | $V_2$ |
|  | SYM |  |  |  | $V_1$ | $V_3$ |

*Fig-5B*

Note:
Open: Open to the Internet (no NAT)
F: Full cone NAT
AR: Address-Restricted cone NAT
PR: Port-Restricted cone NAT
SYM: Symmetric NAT

| Class | | Endpoint Server | | | Browser Client | |
|---|---|---|---|---|---|---|
| | | BOP | SR | Note | BOP | Note |
| I | | - | - | | - | |
| II | | - | - | | X | |
| III | | - | X | | X | Send a BOP repeatedly until it receives a packet. |
| IV | | | | | X | |
| V | $V_1$ | - | - | | X | Sends N p-BOPs to predetected ports with Dp, repeatedly until it receives a packet. (+n·Δp; n=1..N) |
| | $V_2$ | X | X | May send N p-BOPs to subsequent ports. (+n·Δp; n=1..N) | X | Sends a p-BOP repeatedly until it receives a packet |
| | $V_3$ $V_{3A}$ | X | X | May send N BOPs to predetected ports with Δp.. (+n·Δp; n=1..N) | X | Sends N p-BOPs to predetected ports with Dp, repeatedly until it receives a packet. (+n·Δp; n=1..N) |
| | $V_{3B}$ | - | - | | X | |
| | $V_{3C}$ | X | X | May send N p-BOPs to subsequent ports. (+n·Δp; n=1..N) | X | Sends a p-BOP repeatedly until it receives a packet. |
| | $V_{3D}$ | - | - | | X | |

SR: Source port recording

*Fig-20*

PEER-TO-PEER (P2P) CONNECTION DESPITE NETWORK ADDRESS TRANSLATORS (NATS) AT BOTH ENDS

This application is a Continuation-In-Part under 35 U.S.C. § 120 of a U.S. patent application, Ser. No. 10/342,304, filed Jan. 15, 2003 and having the same inventor, the entirety of which is hereby incorporated by reference (hereafter, the "incorporated patent application").

BACKGROUND OF THE INVENTION

In the last decade, the number of computers connected to the Internet has increased by an enormous order of magnitude. High growth in the number of Internet connections has put severe pressure on the available address-space of routable internet protocol (IP) addresses. To overcome the problem of limited and diminishing IP address-space, it became imperative to have a solution that would allow multiple users to share a single routable internet address. The commonly used solution for sharing a single IP address is known as a Network Address Translator (NAT). Operation of a typical NAT is described next.

The basic concept underlying a NAT is to have a device or software module that allows sharing of one or more routable Internet Protocol (IP) addresses by multiple computers. A typical NAT is connected to the public internet on one side and has at least one global or public IP address for receiving and sending data packets from and to the public internet. On the other side of the typical NAT is a private network, in which each network node (computer) is assigned a local arbitrary addresses. Typically, the NAT assigns arbitrary addresses to the nodes of the private network using a Dynamic host Control Protocol (DHCP) or alternatively the NAT assigns static translation addresses.

According to Simple Traversal of UDP through NAT ("STUN", where UDP is the acronym for User Datagram Protocol), there are five basic types of NAT in the Background Art. It is helpful to discuss the differences between the types of NAT, which will be done in terms of the simplistic system block diagrams of Background Art FIGS. 4A-4E.

FIG. 4A depicts a system 400 according to the Background Art that includes: an endpoint device 404; an endpoint device 406 having an IP address X and ports p and q; an endpoint device 408 having an IP address Y and ports p and q; and a full cone type of NAT 404. Devices 404, 406 and 408 are described as "endpoint" devices because they can be the endpoints of a communication session, e.g., between device 404 and device 406 or between device 404 and device 408. While there will be at least one intermediary device, namely the NAT 402, between the endpoint devices, the endpoints themselves are not intermediary devices for the purposes of this explanation.

The endpoint devices 404, 406 and 408, respectively, can be, e.g., a host of server such as an HTTP server, a host of browser such as an HTTP browser, an IP video camera, etc. Typically, the endpoint device 404 is part of a first network 418, and the endpoint devices 406 and 408 are part of a second network 419. The full-cone NAT 402 can be considered as part of each of the first network 418 and the second network 419. The endpoint devices 406 and 408 communicate with the endpoint device 404 via the full-cone NAT 402, and vice-versa, respectively.

In general, any type of the four types of NAT will allocate oh map an address and port-number pair to the endpoint device 404. As a practical matter, this address/port pair makes it seem to devices on the second network 419 as if the endpoint device 404 is directly connected to the second network 419. In particular, the full-cone NAT 402 will accept a packet from any device on the second network 419, e.g., endpoint devices 406 or 408.

In FIG. 4A, a packet (not depicted) can be sent from the endpoint device 404 to the endpoint device 406 through the full-cone NAT 402 using the destination address/port pair X,p, as indicated by path 410. Not surprisingly, a packet (not depicted) sent by the endpoint device 406 to the endpoint device 404 using the source address/port pair X,p will be accepted by the full-cone NAT 402 (and passed along to the endpoint device 404), as indicated by the path 412.

The nature of the full-cone NAT 402 is to accept a packet whose destination address/port pair is the address/port pair mapped to the endpoint device 404, regardless of the packet's source address, i.e., regardless of whether the source address and/or source port of the received packet matches a destination address of a packet previously sent from the endpoint device 404 via the full-cone NAT 402 to the second network 419. As such, packets (not shown) having the following source address/port pairs will also be accepted by the full-cone NAT 402: X,q as indicated by path 413; Y,p as indicated by path 414; and Y,q as indicated by path 416.

In contrast, other types of NAT depicted in FIGS. 4B, 4C, 4D and 4E each exhibit greater restrictions upon what types of packets coming from the second network 419 will be accepted.

FIG. 4B depicts a system 420 that is similar to the system 400 except that an address-restricted cone type of NAT 422 is present instead of the full-cone NAT 402.

In FIG. 4B, a packet (not depicted) can be sent from the endpoint device 404 to the endpoint device 406 through the address-restricted NAT 422 using the destination address/port pair X,p, as indicated by path 424. Not surprisingly, a packet (not depicted) sent by the endpoint device 406 to the endpoint device 404 using the source address/port pair X,p will be accepted by the address-restricted NAT 422 (and passed along to the endpoint device 404), as indicated by the path 424.

The more-restricted nature of the address-restricted NAT 422 is to accept a packet whose destination address/port pair is the address/port pair mapped to the endpoint device 404 so long as the source address in the received packet matches a destination address of a packet previously sent from the endpoint device 404 via the address-restricted NAT 422 to the second network 419, regardless of whether the source port matches the destination port of the packet previously sent from the endpoint device 404 via the full-cone NAT 422 to the second network 419. As such, a packet (not shown) having the address/port pair X,q will be also be accepted by the full-cone NAT 422, as indicated by path 426.

But packets having the following source address/port pairs will not be accepted (i.e., will be blocked) by the full-cone NAT 402: Y,p as indicated by path 430; and Y,q as indicated by path 432. Again, this is because the source addresses of the packets of path 430 and 432 do not match a destination address of a packet previously sent by the address-restricted NAT 422, e.g., such as the destination address of the packet of path 424.

FIG. 4C depicts a system 440 that is similar to the system 420 except that an address&port-restricted ("port-restricted") cone type of NAT 442 is present instead of the address-restricted NAT 422.

In FIG. 4C, a packet (not depicted) can be sent from the endpoint device 404 to the endpoint device 406 through the port-restricted NAT 442 using the destination address/port pair X,p, as indicated by path 444. Not surprisingly, a packet (not depicted) sent by the endpoint device 406 to the endpoint device 404 using the source address/port pair X,p will be accepted by the port-restricted NAT 442 (and passed along to the endpoint device 404), as indicated by the path 446.

The further-restricted nature of the port-restricted NAT 442 is to accept a packet whose destination address/port pair is the address/port pair mapped to the endpoint device 404 so long as the source port as well as the source address in the received packet matches a destination address/port pair of a packet previously sent from the endpoint device 404 via the port-restricted NAT 442 to the second network 419. Consequently, packets having the following source address/port pairs will not be accepted (i.e., will be blocked) by the port-restricted NAT 442: X,q as indicated by path 448; Y,p as indicated by path 450; and Y,q as indicated by path 452.

Again, though the packet of path 448 has a source address that matches the destination address for the packet of path 444, the source port does not match a destination port of a packet previously sent via the port-restricted NAT 442. And both of the source addresses and source ports of the packets of paths 450 and 452, and hence their respective address/port pairs, fail to match the address/port of a packet previously sent via the port-restricted NAT 442.

FIG. 4D depicts a system 460 that is similar to the system 440 except that a symmetric and port-sensitive ("$SYM_S$") type of NAT 462 is present instead of the port-restricted NAT 442. For the purposes of this explanation, it is assumed that the $SYM_S$ 462 has mapped two address/port pairs to the endpoint device 404; namely: a first address/port pair having the address of the $SYM_S$ 462 and port:v; and a second pair having the same address but using port:w.

In FIG. 4D, a packet (not depicted) can be sent from the endpoint device 404 to the endpoint device 406 through port-v of the $SYM_S$ 462 using the destination address/port pair X,p, as indicated by path 464. Not surprisingly, a packet (not depicted) sent by the endpoint device 406 to the endpoint device 404 using the source address/port pair X,p and the destination port-v will be accepted by the $SYM_S$ 462 (and revised and then passed along to the endpoint device 404), as indicated by the path 466.

The yet further-restricted nature of the $SYM_S$ 462 is similar to the port-restricted NAT 442, albeit with a significant difference. For each different destination address/port pair that the endpoint device 404 sends a packet, the $SYM_S$ 462 allocates/maps a separate address/port pair. For a packet to be accepted from the second network 419 by the $SYM_S$ 442, the packet's combination of destination port and source address/port pair should match the combination of source port and destination address/port pair, respectively, of a packet sent to the second network 419 via the $SYM_S$ NAT 462.

It is assumed for the purposes of explanation that a packet will be sent from the endpoint device 404 to each of the endpoint devices 406 (specifically at port:p) and 408 (specifically at port:q) via the $SYM_S$ 462.

For use with respect to port:p of the endpoint device 406 (address/port pair X,p), the $SYM_S$ 462 maps its port:v to the endpoint device 404. Similarly, for use with respect to port:q of the endpoint device 408 (address/port pair Y,q), the $SYM_S$ 462 maps its port:w to the endpoint device 404. The packet (not depicted) sent to port:p of the endpoint device 406 through port:v of the $SYM_S$ 462 is indicated by path 464, while the packet (not depicted) sent to port:q of the endpoint device 408 through port:w of the $SYM_S$ 462 is indicated by path 470. Not surprisingly, a packet (not depicted) sent by the endpoint device 406 to the endpoint device 404 using the source address/port pair X,p will be accepted by the $SYM_S$ 462 (and revised and then passed along to the endpoint device 404), as indicated by the path 466. Similarly, a packet (not depicted) sent by the endpoint device 408 using the source address/port pair Y,q will be accepted by the $SYM_S$ 462, as indicated by the path 472.

But packets having the following source address/port pairs will not be accepted (i.e., will be blocked) by the $SYM_S$ 462: X,q as indicated by path 468; and Y,q as indicated by path 474. Again, though the address portion of the source address/port pair of the packet of path 468 matches an address portion of a packet previously sent via the $SYM_S$ 462, the port portion (namely port:q) of the source address/port pair does not match.

FIG. 4E depicts a system 480 that is similar to the system 460 except that a symmetric and port-insensitive ("$SYM_I$") type of NAT 482 is present instead of the port-restricted NAT 462. For the purposes of this explanation, it is assumed that the $SYM_I$ 482 has mapped two address/port pairs to the endpoint device 404; namely: a first address/port pair having the address of the $SYM_I$ 462 and port:v; and a second pair having the same address but using port:w.

In FIG. 4E, a packet (not depicted) can be sent from the endpoint device 404 to the endpoint device 406 through port-v of the $SYM_I$ 462 using the destination address/port pair X,p, as indicated by path 484. Not surprisingly, a packet (not depicted) sent by the endpoint device 406 to the endpoint device 404 using the source address/port pair X,p and the destination port-v will be accepted by the $SYM_I$ 462 (and revised and then passed along to the endpoint device 404), as indicated by the path 486.

The further-restricted nature of the $SYM_I$ 482 is similar to the port-restricted NAT 462, albeit with a significant difference that makes the $SYM_I$ 482 somewhat similar also to the address-restricted NAT 422. For each different destination address (not address/port pair as with the $SYM_S$ NAT 462) that the endpoint device 404 sends a packet, the $SYM_I$ 462 allocates/maps a separate address/port pair. The $SYM_I$ type of NAT 462 can have two implementations: loose (not separately depicted); and tight (not separately depicted). Depending upon the particular implementation, one of two initialization scenarios, namely tightly initialized or loosely initialized, will describe what sort of initialization should take place before a packet from the second network 419 will be accepted by the $SYM_I$ NAT 482.

First, the loosely initialized scenario for a loose $SYM_I$ NAT 482 will be described. For a packet to be accepted from the second network 419 by the loose $SYM_I$ NAT 482, the packet's combination of destination port and source address (but not also source port) should match the combination of source port and destination address, respectively, of a packet sent to the second network 419 via the loose $SYM_I$ NAT 482. In terms of an example, despite the loose $SYM_I$ NAT 482 having not sent a packet to port:q of the endpoint device 406 (again, address X) via port:v (of the NAT 482), a packet having source address/port pair X,q (i.e., coming from port:q of the endpoint device 406) nevertheless will be accepted by the loose $SYM_I$ NAT 482 (e.g., at its port:v) if the $SYM_I$ NAT 482 has been loosely initialized. Being loosely initialized should be understood as meaning that a packet previously has been sent (in the context of this example) to the endpoint device 406 at another port, e.g., port:p (destination address/port pair X,p) via the $SYM_I$ NAT 482.

The tightly initialized scenario for a tight $SYM_I$ NAT 482 will now be described. For a packet to be accepted from the second network 419 by the tight $SYM_I$ NAT 482, the packet's combination of destination port and source address/port pair (i.e. the combination of source port and source address) should match the combination of source port and destination address/port pair, respectively, of a packet sent to the second network 419 via the tight $SYM_I$ NAT 482. In terms of an example, a packet having source address/port pair X,q (i.e., coming from port:q of the endpoint device 406) will be accepted by the tight $SYM_I$ NAT 482 (e.g., at its port:v) if the $SYM_I$ NAT 482 has been tightly initialized. Being tightly initialized should be understood as meaning that a packet previously has been sent (in the context of this example) to the endpoint device 406 at the same port, e.g., port:q (destination address/port pair X,q) via the $SYM_I$ NAT 482.

After initialization, the loose and tight implementations of the SYMI NAT 482 behave the same. For a packet to be accepted from the second network 419 by the SYMI NAT 482 after initialization, the packet's combination of destination port and source address (but not also source port as with the $SIM_S$ NAT 462) should match the combination of source port and destination address, respectively, of a packet sent to the second network 419 via the SYMI NAT 482. In other words, similar to the address-sensitive NAT 422, for each port on the $SYM_I$ NAT 482, the $SYM_I$ NAT 482 (again, after initialization) will accept packets from different source ports so long as their source address is the same as a packet previously sent to the second network 419 via the $SYM_I$ NAT 482.

It is assumed for the purposes of explanation that a packet will be sent from the endpoint device 404 to each of the endpoint devices 406 (specifically at port:p) and 408 (specifically at port:q) via the $SYM_I$ NAT 482.

For use with respect to the endpoint device 406 (address X), the $SYM_I$ NAT 482 maps its port:v to the endpoint device 404. Similarly, for use with respect to the endpoint device 408 (address Y), the $SYM_I$ NAT 482 maps its port:w to the endpoint device 404. The packet (not depicted) sent to port:p of the endpoint device 406 through port:v of the $SYM_I$ NAT 482 is indicated by path 484, while the packet (not depicted) sent to port:q of the endpoint device 408 through port:w of the $SYM_I$ NAT 482 is indicated by path 490.

Not surprisingly, a packet (not depicted) sent by the endpoint device 406 to the endpoint device 404 using the source address/port pair X,p will be accepted by the $SYM_I$ NAT 482 (and revised and then passed along to the endpoint device 404), as indicated by the path 486. Similarly, a packet (not depicted) sent by the endpoint device 408 using the source address/port pair Y,q will be accepted by the $SYM_I$ NAT 482 (again, after initialization), as indicated by the path 492. Moreover, packets having the following source address/port pairs will also be accepted (i.e., will not be blocked) by the $SYM_I$ NAT 482 (again, after initialization): X,q as indicated by path 488; and Y,q as indicated by path 494.

The full cone NAT 402, the address-restricted NAT 422 and the port-restricted NAT 442 each permits a ratio of 1:N (where N can be any positive integer) between one of its own ports and source addresses or source address/port pairs, respectively, on the second network 419. The 1:N ratio is what gives rise to each of the NATs 402, 422 and 442 being described with the term "cone."

In contrast, each of the $SYM_I$ NAT 482 and the $SIM_S$ NAT 462 permits only a ratio of 1:1 between one of its own ports and a source address or a source address/port pair, respectively, on the second network 419. The 1:1 ratio is what gives rise to each of the NATs 482 and 462 being described with the term "symmetric."

An analogy will be provided to aid the explanation of how the various NATs operate.

The analogy is couched in terms of a doorman to a building (corresponding to the first network 418) in which endpoint device 404 is located. Each of the NATs 402, 422, 442 and 462 can act as a wall of the building. Until the NAT allocates/maps an address/port pair to the endpoint device 404, there are no doors in any of the walls of the building by which a packet from the second network 419 could gain entry or a packet from the endpoint device 404 could leave.

When the NAT allocates/maps an address/port pair to the endpoint device 404, the effect is as if the NAT creates a door in the wall that it represents. From the perspective of the second network 419, the NAT will act as a doorman relative to the doors that it has created.

The NAT (as doorman) keeps the door it created (for the endpoint device 404) closed until the endpoint device 404 sends a packet to the second network 419 via the NAT. In other words, the NAT (as doorman) will not let through packets (from the second network 419) appearing at the door (i.e., where the packet has a destination address the address/port pair allocated/mapped to the endpoint device 404) until the NAT opens the door.

When the endpoint device 404 finally does send a packet to the second network 419 via the NAT, initially the packet's indicated source address is the address on the first network 418 of the endpoint device 404. The NAT revises it so that the packet's indicated source address information becomes the address/port pair which the NAT has allocated to the endpoint device 404, and then passes along the revised packet to the second network 419. In revising and passing along the packet, the effect is as if the NAT (as doorman) opens the door that it has created so that certain packets (depending upon the type of NAT) coming from the second network can pass through the doorway.

The full-cone NAT 402, in its role as doorman, will let through the door any packet appearing at the door (i.e., received by the NAT 402) that is intended for the endpoint device 404 (i.e., whose destination address is the address/port pair that the NAT 402 has mapped to the endpoint device 404). The NAT 402 (as doorman) is the least discriminating type of NAT about what packets it lets through its opened doors. The other NATs 422, 442 and 462 are increasingly more discriminating in their roles as doorman, respectively, checking more than just the packet's destination address/port pair.

The other NATs 422, 442, 462 and 482 treat the packets sent out from the endpoint device 404 as invitations corresponding to a guest list. In their roles as doormen, NATs 422, 442, 462 and 482 act as though they check whether packets appearing at their doors are on a guest list. As should be expected, the guest lists of the NATs 422, 442, 462 and 482 are more selective, respectively, than the full-cone NAT 402.

To be on the guest list for a door opened by the address-restricted NAT 422, a packet from the second network 419 should also have a source address (but not necessarily a source port) that matches a destination address of an invitation (packet) previously sent by the endpoint device via the NAT 422. To be on the guest list for a door opened by the port-restricted NAT 442, a packet from the second network 419 should also have a source address/source port pair that matches a destination address/port pair of a previously sent invitation packet.

Like the port-restricted NAT 442, being on a guest list maintained by the $SYM_S$ 462 in its role as doorman requires that a packet from the second network 419 should also have a source address/source port pair that matches a destination address/port pair of an invitation (packet) previously sent by the endpoint device via the NAT 422. The port-restricted NAT 442 opens only one door for the endpoint device 404 (through which packets of varying destination address can be sent). As such, the port-restricted NAT 442 maintains only one guest list for the endpoint device 404.

In contrast, the $SYM_S$ 462 creates/opens a door for each destination address to which the endpoint device 404 sends a packet. Accordingly, the $SYM_S$ 462 (as doorman) maintains a separate guest list for each door it creates/opens for the endpoint device 404. So in FIG. 4D, a packet having destination port:v and source address/port pair Y,q would not be on either the guest list corresponding to door:v (port:v) or door:w (port:w). This is because the endpoint device 404 never sent a packet to source address/port pair Y,q via port:v. Rather, the packet sent to source address/port pair Y,q was sent via port:w (again, see path 470).

Like the $SYM_S$ NAT 462, the $SYM_I$ NAT 462 (as doorman) maintains a separate guest list for each door it creates/opens for the endpoint device 404. But unlike the $SYM_S$ NAT 462, the $SYM_I$ NAT 462 (as doorman) creates/opens only one door for each address on the second network 419, i.e., different ports of the same address use the same door created/opened by the $SYM_I$ NAT 462 albeit after initialization.

So in FIG. 4E, after initialization, the packet (not depicted) of path 488 having destination port:v and source address/port pair Y,q is on the guest list corresponding to door:v (port:v). Similarly after initialization, the packet (not depicted) of path 494 having destination port:w and source address/port pair Y,p is on the guest list corresponding to door:w (port:w).

This concludes explanation of the analogy.

The NAT provides a convenient way of providing shared and transparent communication between the public internet and the computers (attached to a private network) having a non-globally-unique IP address, i.e., an IP address that is not globally-unique. However, not all forms of communications are operable over a NAT. This is a problem. Many types of applications require a globally-unique IP address as a termination point or require IP address consistency over the whole communication cycle. For example, an IP enabled phone will typically require a globally-unique IP address to receive and send voice-transmission using the IP. The presence of a NAT at the receiving end of the IP phone call may block the receiver (the endpoint device) from receiving the phone IP packets.

The presence of NATs in a network poses another type of problem as described next. There is no simple and convenient way to access a server type of device located behind a NAT from the public internet side of the NAT. For example, if a Hypertext Transfer Protocol (HTTP) webserver is located behind a NAT, then it has a private address which is invisible to the outside world through the public internet. On the contrary, a typical webserver, e.g., an HTTP server, which is not behind a NAT is readily accessible from the public internet if it has an IP address that can be resolved using common methods like the Domain Name System (DNS).

TCP/IP allows multiple applications to run on a single computer using a variety of port numbers. When a NAT is used by a private network to share an IP address, then the port addresses are shielded behind the NAT from the outside network. This situation can be further complicated by presence of a firewall with a security policy that does not allow access to specific ports of the computers on the private network as described next.

A port-forwarding solution creates a "tunnel" through the firewall so that external users from the public internet can access a specific computer in the private network using the designated port for the tunnel. Typically, a port forwarding solution has a maximum number of about five forwarded port entries. But many applications like network-gaming, instant messaging and collaboration software may require access to previously "unopened" specific TCP/UDP ports from the external public internet. Creating all the required tunnels for such applications can be an impractical task for a typical user, since the tunnel configuration process can be complicated and confusing. Port forwarding is typically a kind of functionality provided by a router, hence it typically raises a need for a specific router that has an inbuilt port forwarding capability.

The presence of a NAT may not affect the network much if the transport connections are initiated from the clients that are behind the NAT. But if a server is located behind a NAT, then IP requests originating from the public network may not be able to access the server due to the presence of the NAT. An approach to solve this problem, and its drawbacks are discussed next. In a Dynamic Domain Name System (DDNS) the users attempting to access a server located behind a NAT using a Fully Qualified Domain Name (FQDN) may face problems. Such problems result from the situation when a server or device behind a NAT is assigned a private IP address by a NAT which is invisible. A DDNS trying to route packets to an IP address due to a FQDN access request will fail since the NAT-assigned private address is invisible to the public internet side of the NAT.

Attempts have been made to define protocols for solving the NAT traversal problem described above. For example, protocols such as TURN (Traversal Using Relay NAT), STUN (Simple Traversal of UDP through NAT), SPAN-A (Simple Protocol for Augmenting NATS), etc., provide an approach that does not require routers to have the specific functionality of supporting NAT traversal. However, these protocols do not provide a complete NAT traversal mechanism. These protocols are to be handled by an application known as SIP (Session Initiation Protocol).

Gnutella is a Peer-To-Peer (P2P) file-sharing system. The Gnutella protocol ("The Gnutella Protocol Specification v0.4 Document Revision 1.2") is widely used by Gnutella clone systems such as Kazaa, BearShare, etc. Unlike a centralized server network, the Gnutella protocol does not rely on a central server to keep track of all shared files. The Gnutella protocol uses multiple nodes known as "servents" each of which can become both a server and a client. The Gnutella protocol uses TCP protocol for a communication between the servents.

Once a servent finds an IP address of another servent which has a file the servent wants to download, it starts downloading the file through the TCP connection between the two. The Gnutella protocol can accommodate the presence of one NAT between two servents. If a servent is behind a NAT, other servents cannot initiate a TCP connection. In this case, the other servents send a "Push" descriptor to tell the server behind the NAT to initiate the TCP connection back to the other servents.

SUMMARY OF THE INVENTION

Embodiments of the invention provide methods of operating a first endpoint device (ED) facilitate the making of a peer-to-peer (P2P) connection between the first ED and a second ED despite intervening network address translators (NATs) at both ends. The P2P connection extends across a system compliant with the internet protocol (IP) whose architecture that includes a first network (having at least the first ED and a first NAT), a second network (having at least the second ED and a second NAT) and a third network. The first ED connects to the third network via the first NAT while the second ED connects to the third network via the second NAT.

One such embodiment according to the invention provides a facilitation method that includes: providing the second ED with the first IP-address/port pair; and providing the second ED with first type-information regarding the type of the first NAT.

Another such embodiment provides a facilitation method that includes: generating a session description protocol (SDP) message including an SDP attribute that describes the type of the NAT; and sending the SDP message to the second network from the first network.

Another such embodiment provides a facilitation method, for determining a port increment size ($\Delta p$) for a symmetric network address translator (NAT), that includes: requesting the symmetric NAT to map a plurality of port identification numbers (IDs); receiving information regarding the plurality of port IDs; and comparing the information to determine an increment size ($\Delta p$) of the NAT.

Another such embodiment provides a facilitation method that includes: receiving an indication of increment size ($\Delta p$) used by the second NAT to allocate/map new port numbers; and predicting, based upon the indication of increment size ($\Delta p$), at least one predicted destination port identification number ("ID") that would be used by the second NAT for the P2P connection between the first ED and a second ED.

Other embodiments provide the corresponding software and the corresponding devices that perform the methods, respectively.

Further areas of applicability of the invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention will become more fully understood from the detailed description and the accompanying drawings, wherein:

FIG. 5A is a table showing how possible combinations of NAT-types can be organized into classes according to an embodiment of the invention.

FIG. 5B is a more detailed version of FIG. 5A that shows how Class V can be further organized into subclasses according to another embodiment of the invention.

FIG. 20 depicts a table that organizes actions, according to an embodiment of the invention, which can be taken toward establishing a P2P connection, depending upon the classes and subclasses described in FIG. 5B.

DETAILED DESCRIPTION OF EXAMPLE EMBODIMENTS

The following description of the example embodiment(s) is merely exemplary in nature and is in no way intended to limit the invention, its application, or uses.

The following acronyms are used below: UDP=User Datagram Protocol; NAT=Network Address Translation (Translator); IETF=Internet Engineering Task Force; STUN=Simple Traversal of UDP through NAT; TURN=Traversal Using Relay NAT; P2P=Peer-To-Peer (as opposed to 'server and client'); DNS=Domain Name Server; DDNS=Dynamic DNS; FQDN=Fully Qualified Domain Name; HTTP=Hyper Text Transfer Protocol; HTML=Hyper Text Markup Language; URI=Uniform Resource Indicator; URL=Uniform Resource Locator (a subset of all URIs, couched in terms of primary access technique); IP=Internet Protocol; TCP=Transmission Control Protocol; RTP=Real-time Transfer Protocol; and SDP=Session Description Protocol.

Until noted below, the following section briefly discusses some aspects of the incorporated patent application.

Figure 1:
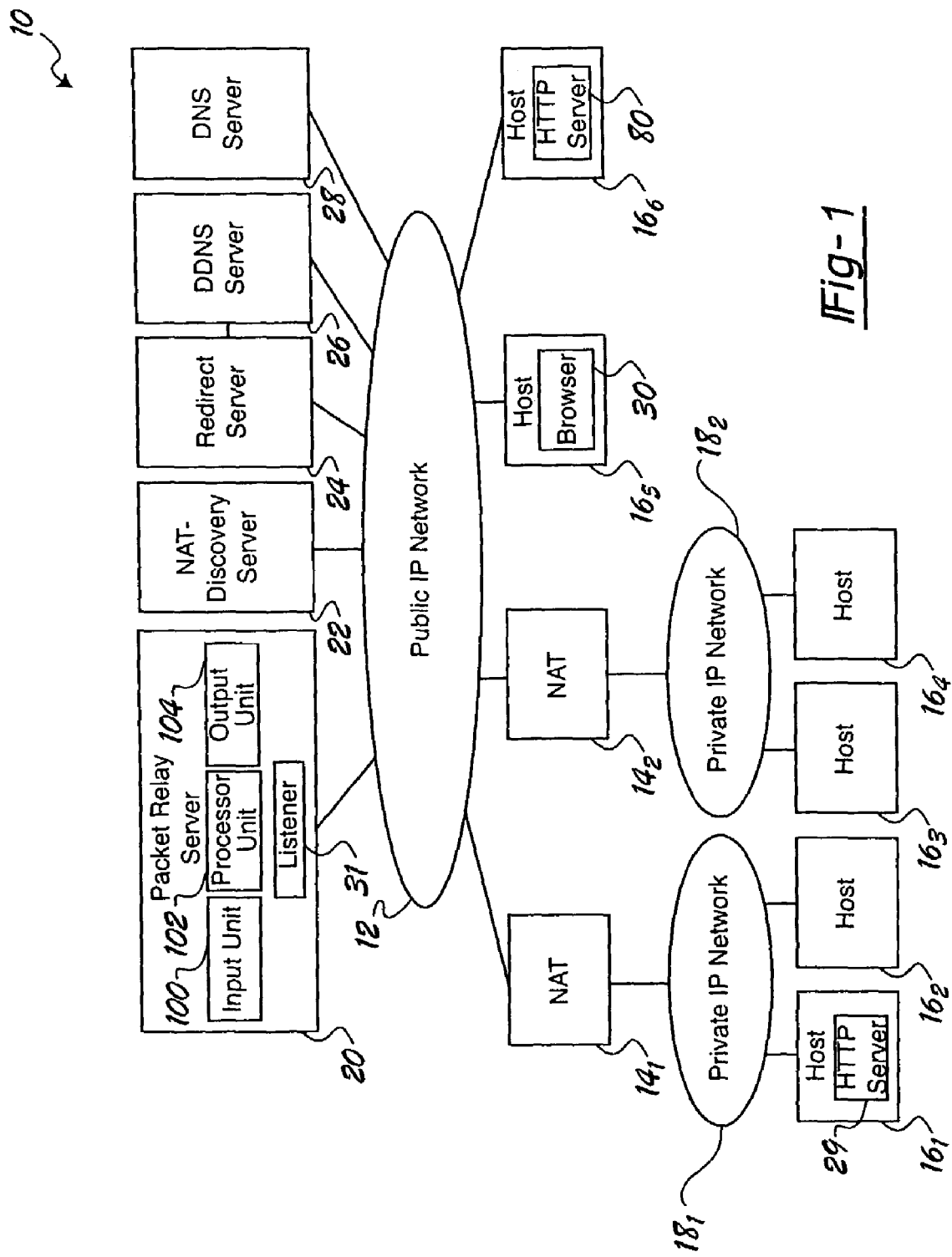
FIG. 1 shows a network configuration according to an embodiment of the invention.

FIG. 1 shows a network configuration 10 according to an embodiment of the invention of the incorporated application. Network configuration 10 includes a public IP network 12 that can be, e.g., the Internet.

Included as being attached to the public network 12 are: a packet relay server 20, a NAT-discovery server 22, e.g., a STUN (Simple Traversal UDP (User Datagram Protocol) through NATs) server, a redirect server 24, a dynamic DNS (DDNS) server 26, a DNS (domain name system) server 28, a host computing device $16_5$, a host computing device 166, a network address translator (NAT) $14_1$ and a NAT $14_2$.

The network configuration 10 further includes a private network $18_1$ and a private network $18_2$. Host computing devices $16_3$ and $16_2$ connect to the network $18_1$ while host computing devices $16_3$ and $16_4$ connect to the network $18_2$.

For the purposes of subsequent discussion, it can be helpful to think in terms of examples in which there is: an application, e.g., a web browser 30, that runs on the host $16_5$; an application, e.g., an HTTP server 29, that runs on the host $16_1$; an input unit 100, a processing unit 102 and an output unit 104 in the relay server 20; an application, e.g., a listener 31, that runs on the packet relay server 20; and an application, e.g., an HTTP server 80, that runs on the host $16_6$.

Host $16_1$ is indirectly connected to the public network 12 via the NAT $14_1$ and the private IP network $18_1$. In contrast, host $16_5$ is directly connected to the public IP network 12.

Network configuration 10 described above including the hosts, NATs and private IP networks is a non-limiting example of how the network configuration 10 can be implemented in an embodiment of the invention of the incorporated patent application. As a practical matter, the presence of NAT $14_1$ will not allow a typical client, e.g., the browser 30, to directly access the HTTP server 29 on host $16_1$, since the browser 30 is most unlikely to have the port number of host $16_1$ that was assigned by the NAT $14_1$. This problem is known as the NAT traversal problem. To perform a NAT traversal, network configuration 10 according to an embodiment of the invention of the incorporated patent application includes additional elements as described next.

After booting up, the HTTP server 29 running on the host $16_1$ performs a NAT-discovery process, e.g., a STUN test, resulting in an indication that the NAT $14_1$ is present in the connection between the host $16_1$ and the STUN server 22.

After positively determining the presence of a NAT, the host $16_1$ connects to the packet relay server 20, which is operable to receive and forward IP packets. Host $16_1$ initiates a TCP (Transmission Control Protocol) session and sends a packet relay initiation request to the input unit 100 of the relay server 20. In response, the processing unit 102 of the relay server 20 can run a TCP application known as a listener 31.

The output unit 104 of the relay server 20 returns to the host $16_1$ a global IP address (namely, the IP address of the packet relay server 20) and a port on which it (namely, the packet relay server 20 running the listener 31) will receive and send packets on behalf of the host $16_1$.

Hosts connected to the public IP network 12 such as the Internet can send packets to the IP address and port number designated by the relay server 20 as the listener 31. The listener 31 in turn forwards such packets to the host $16_1$. Similarly, the host $16_1$ can send packets to the relay server 20, and the relay server 20 can rewrap the payloads and transmit them to the specific forwarding IP address given in the packets.

After obtaining the set of global IP address and port number from the relay server 20, the host $16_1$ via the NAT $14_1$ provides the redirect server 24 with the IP address and port number of the listener 31. Then the redirect server 24 can redirect HTTP requests from the public IP network 12 seeking the HTTP server 29 to the global IP address and port number of the listener 31 on the relay server 20.

The HTTP server 29 on host $16_1$ is assigned a FQDN, which is statically associated with a global IP address on the redirect server 24. The redirect server 24 adaptively maps the FQDN to the dynamic IP address and port number of the listener 31. Hence, when a user (not depicted) makes a request via the browser 30 to access the FQDN, the request from the browser 30 will first be received by the redirect server 24. The redirect server 24 can use multiple methods to redirect the HTTP request to the listener 31 on the relay server 20, e.g., by providing a "splash page" (not depicted) to the browser 30 that can include a hyperlink to the listener 34 or by automatically redirecting the HTTP request to the listener 34 using the "307 Temporary Redirect" feature of the HTTP 1.1 protocol or by using a combination of a splash page with an automatic JAVA-script-based redirect method.

Figure 2:
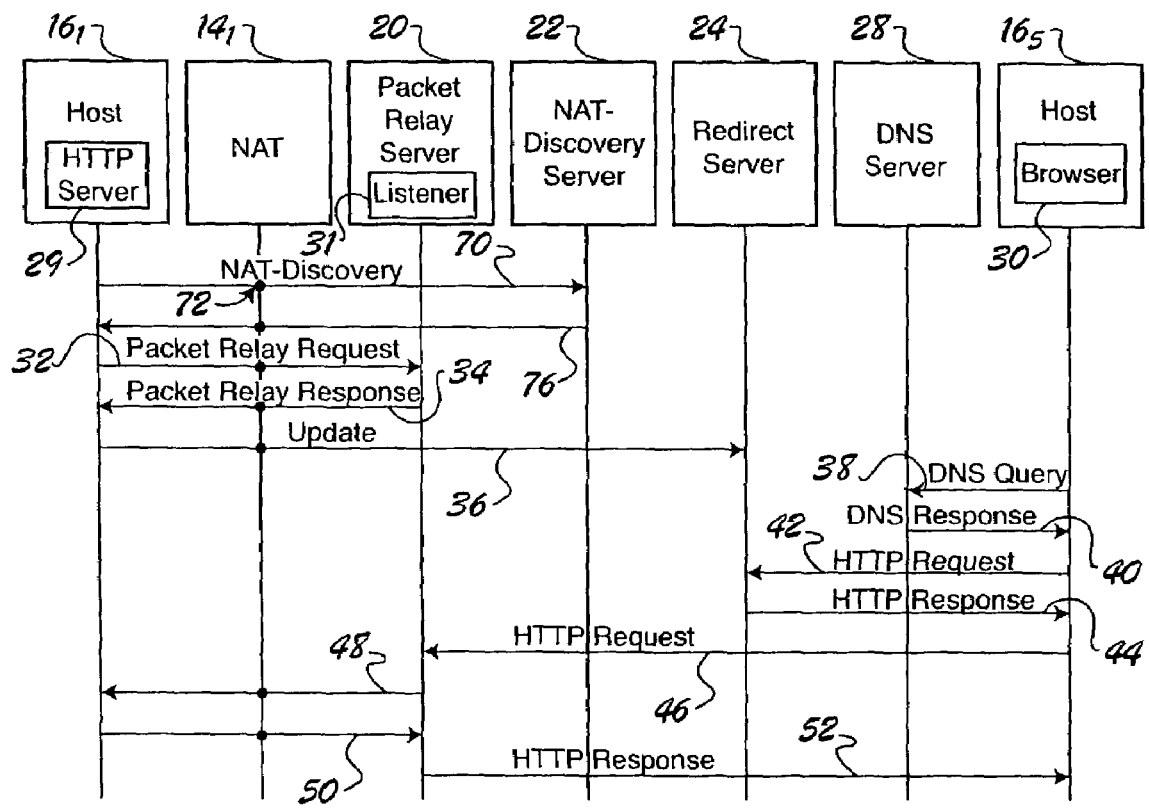
FIG. 2 is a sequence diagram of operations according to an embodiment of the invention.

FIG. 2 is a sequence diagram of operations according to an embodiment of the invention of the incorporated patent application. FIG. 2 does not strictly conform to the conventions of UML-type sequence diagrams. After booting-up, the HTTP server 29 running on the host $16_1$ sends a message 70 initiating a NAT-discovery process, e.g., a STUN test. The message 70 is sent to the NAT-discovery server, e.g., STUN server 22, via the NAT $14_1$. The intervening role of the NAT $14_1$ is indicated by the dot 72 at the intersection of the message 70 and the lifeline 74 of the NAT $14_1$. Such a dot convention will be used for other messages passing via the NAT $14_1$. The NAT-discovery server 22 sends a return message 76 to indicate the presence of the NAT $14_1$ to the host $16_1$.

Host $16_1$ sends a message 32 to the packet relay server 20 requesting it to open a listener 31. The packet relay server 20 sends back a message 34 to the host $16_1$ indicating the global IP address (of the packet relay server 20) and the port number (on the packet relay server 20) assigned to the listener 31. The host $16_1$ then updates the redirect server 24 by a message 36 to register the global IP address and port number of the listener 31 on the relay server 20. The redirect server 24 will authenticate the message 36 and update its database to associate the IP address and port number of the listener 31 with the FQDN of the HTTP server 29. After the above initiation process is over, the user can access the, e.g., of the browser 30 on the host $16_5$, HTTP server 29 running on the host $16_1$.

Harkening back to the example, it is to be noted that the browser 30 on the host $16_5$ is representative of any computer or IP-enabled device connected to the public IP network 12 (shown in FIG. 1). When the user of the browser 30 types in the URL (Universal Resource Locator), e.g., FQDN, of the HTTP server 29, the browser 31 on the host $16_5$ sends a message 38 to the DNS server 28 with the FQDN in order to obtain the DNS entry of the entered URL. The DNS server 28 sends back a message 40 to the host $16_5$ with the IP address of the redirect server 24. It may be necessary for the DNS server 28 to communicate (not shown as a message in FIG. 2) with the DDNS server 26 in order to collectively provide the IP address of the redirect server 24 to the browser 30.

The typical browser 30 on the host 165 can then initiate an HTTP request to the IP address of the redirect server 24 on the default port 80 (for HTTP protocol communications) via a message 42. The redirect server 24 in turn checks its database to find a set of IP address and port number of the listener 31 on the relay server 20 that correspond to the requested URL or URI (Universal Resource Indicator).

Host $16_5$ (as part of hosting the browser 30) then sends an HTTP request to the relay server 20 as indicated by the message 46 based on the redirection IP address and port number received from the redirect server 24. The relay server 20 in turn sends a message 48 to the host $16_1$ with which it has maintained a live TCP session.

On the return side, the host $16_1$ (as part of hosting the HTTP server 29) will send a response to the packet relay server 20 as message 50. Further, the relay server 20 transmits the response to the browser 30 on the host $16_5$. Thus, an HTTP session is established where the browser 30 on the host $16_5$ can access the HTTP server 29 on the host $16_1$ even though the host $16_1$ is located behind the NAT 141, i.e., even though the NAT $14_1$ is located between the browser 30 and the HTTP server 29.

Such NAT traversal is achieved above without the browser 30 on the host $16_5$ having knowledge of the private IP address of the HTTP server 29 shielded by the NAT $14_1$. No manual step or configuration is required at the host $16_5$, i.e., on the user side of the HTTP access operation.

The preceding section, as noted above, briefly discusses some aspects of the incorporated patent application.

An embodiment of the invention, in part, represents the recognition of the following: SIP (again, Session Initiation Protocol) does not provide a way to establish a P2P connection through NATs at both ends where one of the following NAT combinations is present: A symmetric NAT and an address-restricted NAT; a symmetric NAT and port-restricted NAT; and a symmetric NAT and a symmetric NAT. Also, the "Push" scheme of the Gnutella protocol does not work in the circumstance that each of the endpoints have one or more NATs.

An embodiment of the invention is, in part, the recognition of the following. Based upon the NAT traversal mechanism described above, a client (e.g., an HTTP browser) can reach an endpoint device (e.g., an HTTP server) regardless of whether or not both the server and client are behind NATs. However, all the traffic would have to go through the packet relay server. In the circumstance of the packet content being data, e.g., multimedia data, that consumes large bandwidth, e.g., where the server is an IP video camera, the traffic load on packet relay server can be significant.

An embodiment of the invention provides multiple relay servers as a solution to the recognized problem, namely large bandwidth data overly loading a packet relay server being used for NAT traversal. A concern can be, from a business point of view, that providing multiple relay servers could potentially be prohibitively expensive.

Another embodiment of the invention solves the recognized problem mentioned above (again, large bandwidth data overly loading a packet relay server being used for NAT traversal) by changing the way that the data is exchanged after the packet-relay-server-based connection has been established, e.g., by providing a method that facilitates the making of a peer-to-peer (P2P) connection (e.g., using the STUN protocol) between two endpoint devices (e.g., an HTTP server and would-be client of the server) through one or more NATs interposed between the two.

Different types of NATs exhibit different circumstances under which incoming UDP packets (from a first, e.g., public, network that are to be forwarded via the NAT into a second, e.g., private, network) will be accepted by the NAT. By accounting for such differences, embodiments of the invention can establish P2P connections through NATs even though NATs are at both ends of the connection. A NAT-discovery process, e.g., such as provided by the STUN protocol, can be used not only to detect the presence of a NAT, but also to analyze the type of NAT. Knowledge of the NATs at one or both ends will determine what the two endpoint devices, e.g., the server and the client, should do to establish the P2P connection.

FIG. 5A is a table showing possible combinations of NAT-types (including the absence, or no, NAT) interposed as part of a connection between two endpoint devices. FIG. 5A also shows how such combinations can be organized into classes according to an embodiment of the invention. In particular, the rows represent possible types of NAT adjacent to a first endpoint device, e.g., an HTTP server, while the columns represent possible types of NAT adjacent to a second endpoint device, e.g., an HTTP client such as a browser.

FIG. 5B is a more detailed version of FIG. 5A that shows how Class V can be further organized into subclasses V1, V2 and V3 according to another embodiment of the invention.

Each of the classes of FIG. 5B will now be discussed in view of FIGS. 6A-19C. To further the explanation, each of FIGS. 6A-17C assumes the following. The first endpoint device 629 is an HTTP server (hereafter "endpoint server"), e.g., an IP video camera, and that the second endpoint device 630 is a host/PC running an HTTP client such as a browser. In this regard, the HTTP server corresponds to the server 29 of FIG. 2 and the HTTP browser corresponds to the browser 630 of FIG. 2. Further, it is assumed that a packet-relay-server-based connection exists between the first endpoint device 629 and the second endpoint device 630 via a relay server (not depicted) (hereafter "implied relay server"), e.g., taking the form of a TURN server. The relay sever can correspond to the relay sever 20 of FIG. 2. Also, a NAT-discovery server 622, e.g., taking the form of a STUN server, is assumed to be present. The NAT-discovery server 622 can correspond to the NAT-discover server 22 of FIG. 2. It is noted that the first endpoint device, the second endpoint device, the relay server and the NAT-discovery server 622 can take other forms.

Class I will now be discussed in terms of FIGS. 6A-6B.
Conditions Of Class 1:

| endpoint server side | Any Type Of NAT. |
|---|---|
| browser side | No NAT. (Open to the Internet) |

Figure 6A:
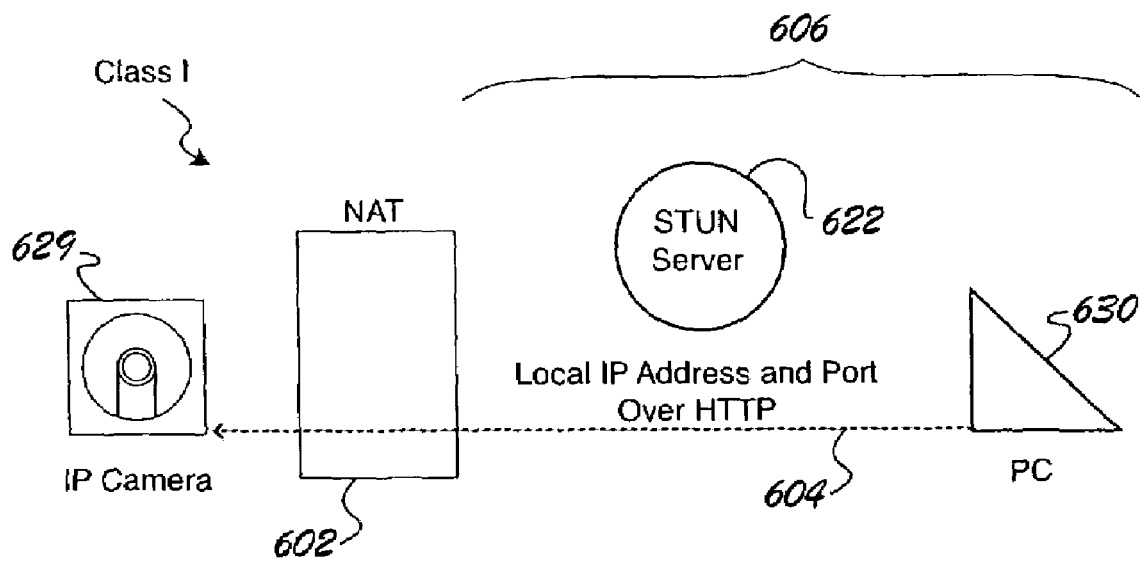
FIGS. 6A-6B, 7A-7C, 8A-8C, 9A-9C, 10A-10C, 11, 12, 13A-13 14C, 15A-15D, 16A-16D, 17A-17C, 18A-18D and 19A-19C are hybrid block-sequence diagram that further the discussion of how to handle the classes of FIG. 5B, according to embodiments of the invention, respectively.
Figure 6B:
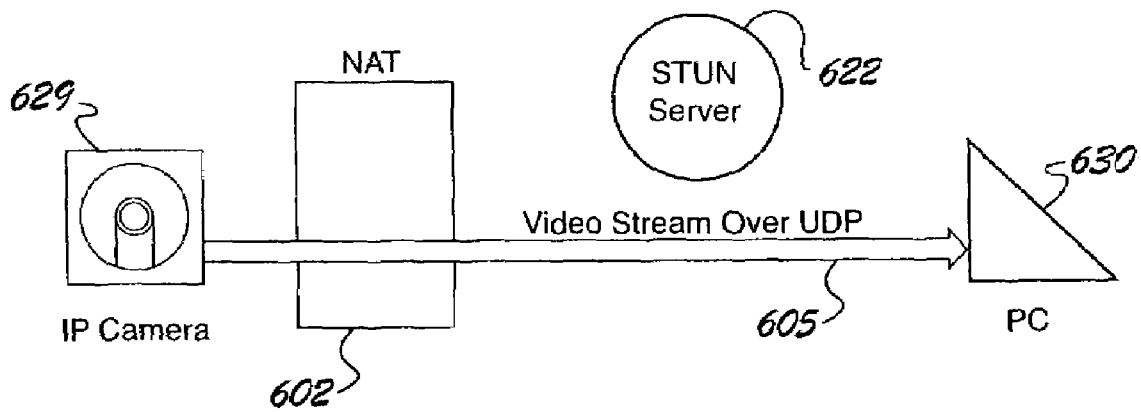

To further the context of the explanation, FIGS. 6A-6B assume that the endpoint server 629 connects via a NAT 602 (of any of the types discussed above) to an IP network 606 including the NAT-discovery server 622, the implied relay server and the browser 630. The browser is not associated with a NAT. In FIG. 6A, the endpoint server 629 receives (via the implied relay server and the NAT 602) information from the browser 630 as to the local address/port pair of the browser 630, as indicated by path 604. In FIG. 6B, the endpoint server 629 sends a stream of packets (e.g., a video stream where the endpoint server 629 is an IP video camera) over a UDP type of P2P connection to the browser 630, as indicated by path 605.

Class II will now be discussed in terms of FIGS. 7A-7C.
Conditions of Class II:

| endpoint server side | Any Type Of NAT (except a symmetric NAT in the case where the browser side has a port-restricted NAT). |
|---|---|
| browser side | Full/Address-Restricted/Port-restricted cone NAT |

Figure 7A:
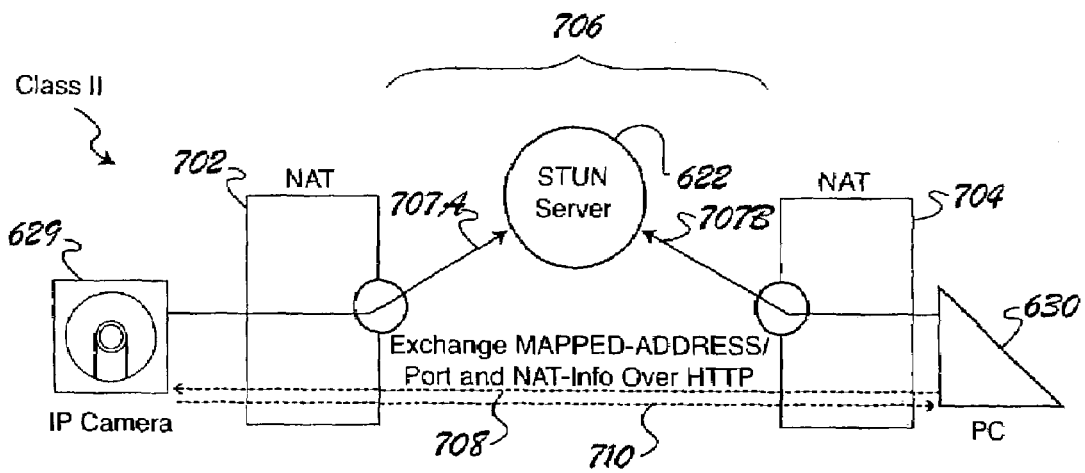
Figure 7B:
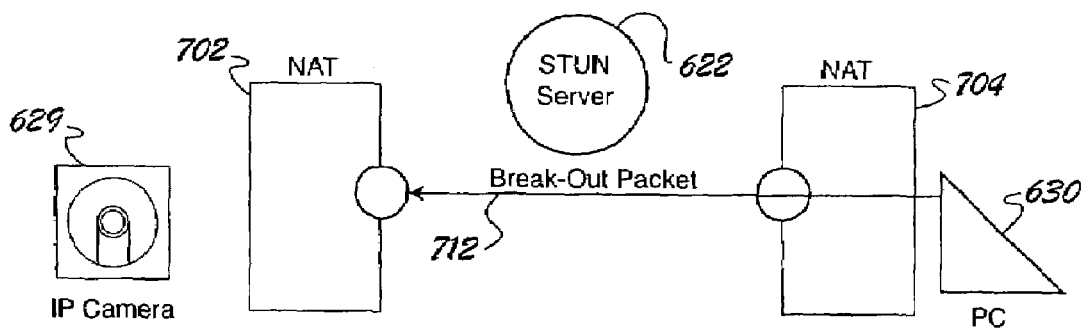
Figure 7C:
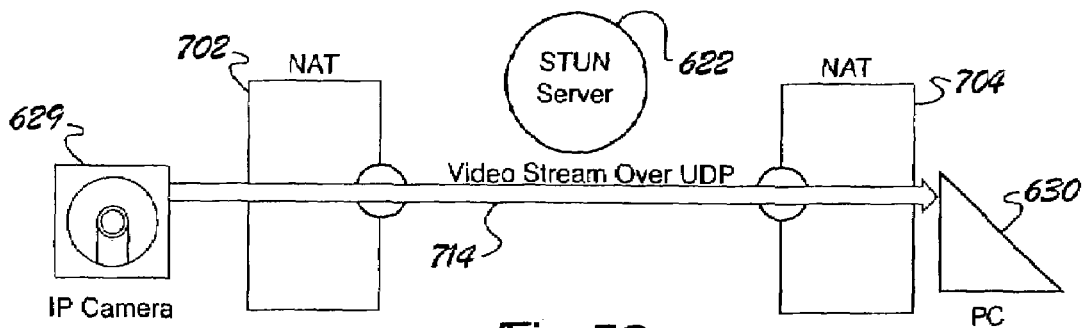

To further the context of the explanation, FIGS. 7A-7C assume that: the endpoint server 629 connects to an IP network 706 (that includes the implied relay server and the NAT-discovery server 622) via a NAT 702; and the browser 630 connects to the network 706 via a NAT 704. The NAT 704 can be any of the following types: full cone; address-restricted; or port-restricted. The NAT 702 can be any type of NAT except a symmetric NAT in the case where the NAT 704 is a port-restricted NAT.

In FIG. 7A, the endpoint server 629 communicates with the NAT-discovery server 622 (via the NAT 702) to determine the address/port pair mapped by the NAT 702 to the endpoint server 629 and what type the NAT 702 is, as indicated by path 707A. Similarly, the browser 630 communicates with the NAT-discovery server 622 (via the NAT 704) to determine the address/port pair mapped by the NAT 704 to the browser 630 and what type the NAT 704 is, as indicated by path 707B. Information as to the type of NAT and how an endpoint device determines that information will be discussed below.

An endpoint device, such as the endpoint server 629 or the browser 630, can determine the type of the NAT through which it communicates using a NAT type-discovery process, for example the STUN discovery process disclosed in the document entitled "STUN—Simple Traversal of UDP Through Network Address Translators," J. Rosenberg et al., Internet Engineering Task Force, draft-ietf-midcom-stun-02.txt, dated Aug. 22, 2002 (expires February 2003) (the entirety of which is hereby incorporated by reference), see, e.g., section 10.1 and FIG. 2.

The endpoint server 629 receives from the browser 630 (via the NAT 704, the implied relay server and the NAT 702) information regarding the address/port pair mapped by the NAT 704 to the browser 630 and what type the NAT 704 is, as indicated by path 708. Similarly, the browser 630 receives from the endpoint server 629 (via the NAT 702, the implied relay server and the NAT 704) information regarding the address/port pair mapped by the NAT 702 to the endpoint server 629 and what type the NAT 702 is, as indicated by path 710.

FIG. 7B assumes the circumstance that the NAT 704 is either a full-cone NAT, an address-restricted NAT or a port-restricted NAT. So in FIG. 7B, the browser 630 sends a break-out packet ("BOP") to the endpoint server 629, as indicated by path 712. The BOP might or might not be blocked by the NAT 702 depending upon what type of NAT it is. The purpose of the BOP of path 712 is not thwarted if it is blocked by the NAT 702. Rather, a purpose of sending the BOP of path 712 is to open the door in the NAT 704 to packets from the endpoint server 629 sent via the NAT 702.

In FIG. 7C, the endpoint server 629 sends a stream of packets (e.g., a video stream where the endpoint server 629 is an IP video camera) over a UDP type of P2P connection to the browser 630, as indicated by path 714. Because the door at the NAT 704 was previously opened via the BOP of path 712, the NAT 704 accepts the stream of packets of path 714.

Class III will now be discussed in terms of FIGS. 8A-8C. Condition of Class III:

| endpoint server side | No NAT. (Open to the Internet) |
|---|---|
| browser side | Symmetric NAT |

Figure 8A:
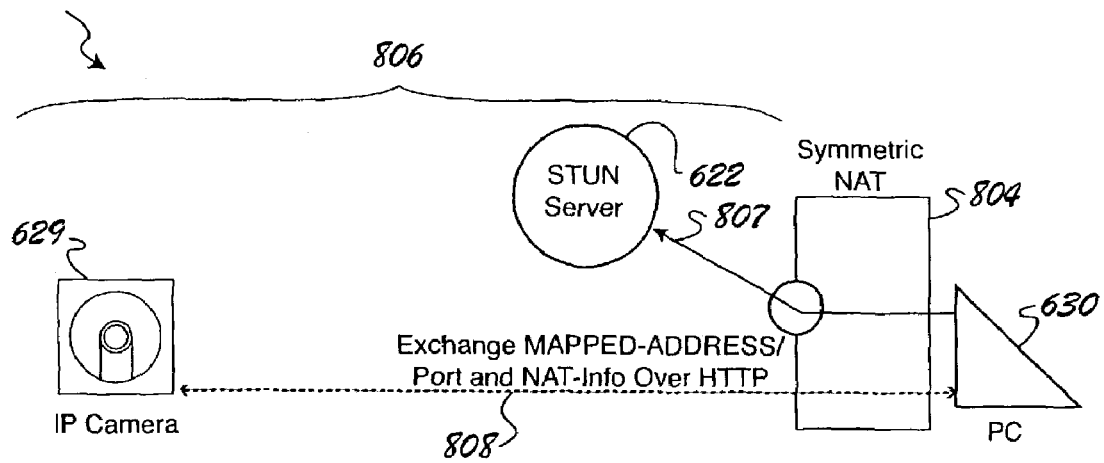
Figure 8B:
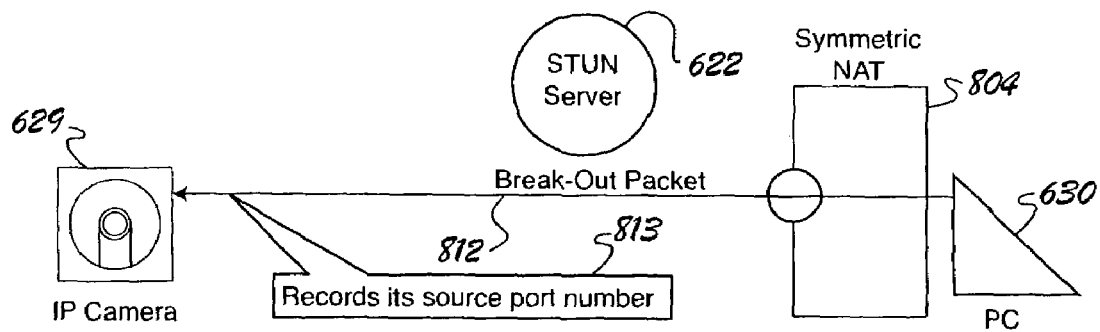
Figure 8C:
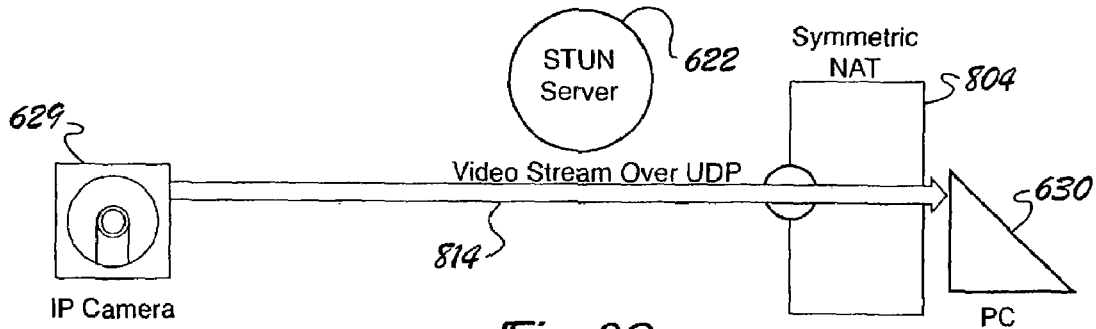

To further the context of the explanation, FIGS. 8A-8C assume that: the endpoint server 629 is part of a network 806 (that includes the implied relay server) and is not associated with a NAT; and the browser 630 connects to the network 806 via a symmetric NAT 804.

In FIG. 8A, the browser 630 communicates with the NAT-discovery server 622 (via the NAT 804) to determine the address/port pair mapped by the NAT 804 to the browser 630 and what type the NAT 804 is, as indicated by path 807. The endpoint server 629 receives from the browser 630 (via the NAT 804) information regarding the address/port pair mapped by the NAT 804 to the browser 630 and what type the NAT 804 is, as indicated by path 808.

In FIG. 8B, the browser 630 sends a break-out packet ("BOP") to the endpoint server 629, as indicated by path 812. A purpose of the BOP of path 812 is to open the door in the NAT 804 to packets from the endpoint server 629. Here, another purpose is that the endpoint server 629 records (as indicated by item 813) the address/source pair mapped by the NAT 804 to the browser 630.

In FIG. 8C, the endpoint server 629 sends a stream of packets (e.g., a video stream where the endpoint server 629 is an IP video camera) over a UDP type of P2P connection to the browser 630, as indicated by path 814. Because the door at the NAT 804 was previously opened via the BOP of path 812, the NAT 804 accepts the stream of packets of path 814.

Class IV will now be discussed in terms of FIGS. 9A-9C. Conditions of Class IV:

| endpoint server side | Full/Address-restricted cone NAT |
|---|---|
| browser side | Symmetric NAT |

Figure 9A:
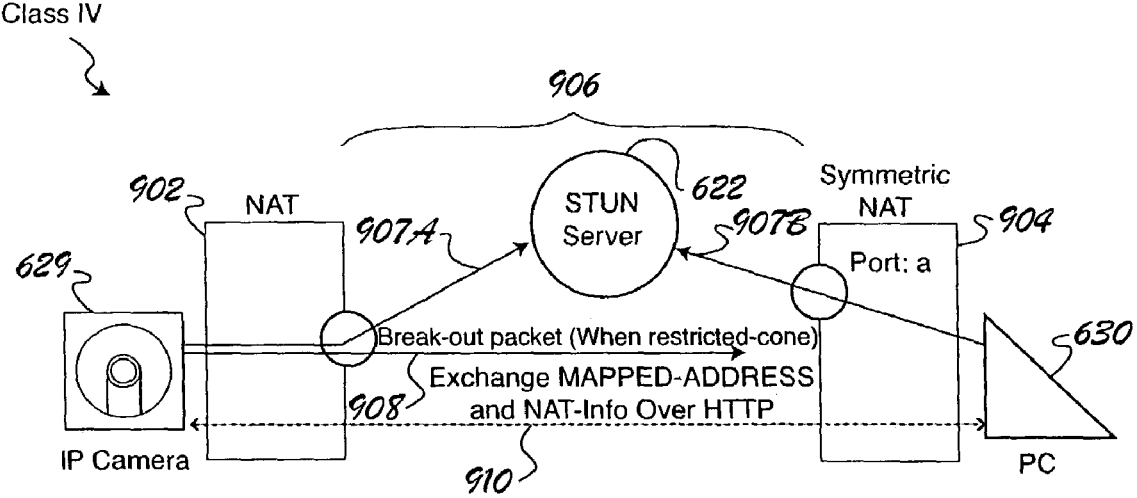
Figure 9B:
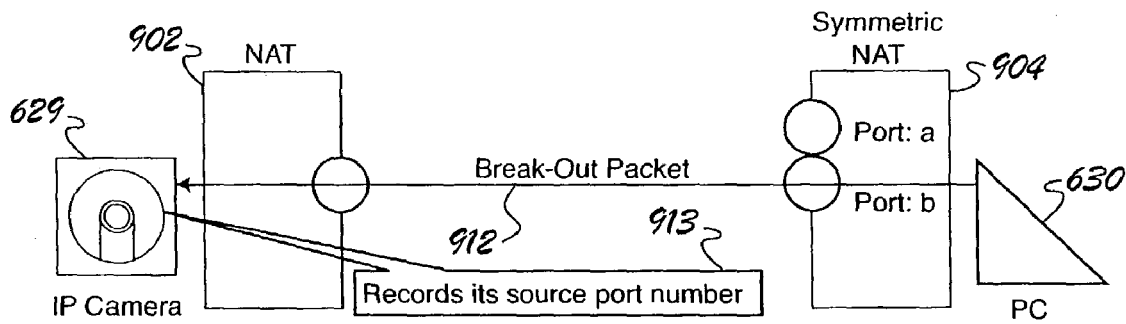
Figure 9C:
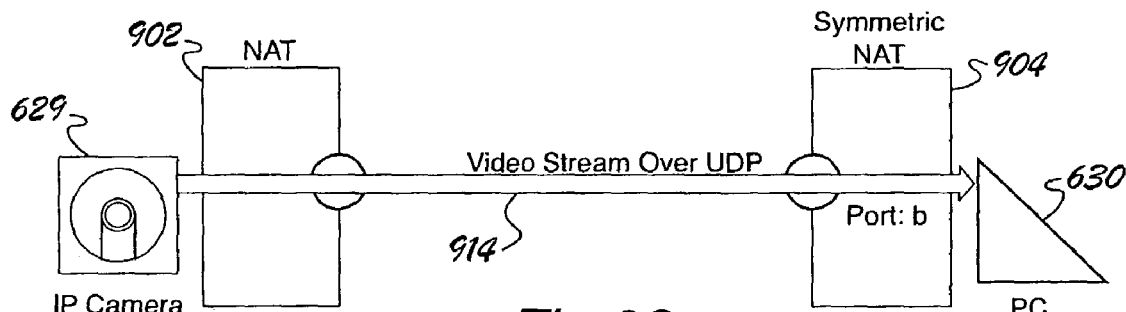

To further the context of the explanation, FIGS. 9A-9C assume that: the endpoint server 629 connects to an IP network 906 (that includes the implied relay server and the NAT-discovery server 622) via a NAT 902; and the browser 630 connects to the network 906 via a symmetric NAT 904. The NAT 902 can be a full cone type or address-restricted cone type of NAT.

In FIG. 9A, the endpoint server 629 communicates with the NAT-discovery server 622 (via the NAT 902) to determine the address/port pair mapped by the NAT 902 to the endpoint server 629 and what type the NAT 902 is, as indicated by path 907A. Similarly, the browser 630 communicates with the NAT-discovery server 622 (via the NAT 904) to determine the address/port pair mapped by the NAT 904 to the browser 630 and what type the NAT 904 is, as indicated by path 907B.

A path 910 indicates that: the endpoint server 629 receives from the browser 630 (via the NAT 904, the implied relay server and the NAT 902) information regarding the address/port pair mapped by the NAT 904 to the browser 630 and what type the NAT 904 is; and the browser 630 receives from the endpoint server 629 (via the NAT 902, the implied relay server and the NAT 904) information regarding the address/port pair mapped by the NAT 902 to the endpoint server 629 and what type the NAT 902 is.

In the circumstance that the NAT 902 is an address-restricted NAT, the endpoint server 629 sends a BOP via the NAT 902 to the browser 630, as indicated by path 908. A purpose of the BOP of path 908 is to open a door in the NAT 902 to packets from the browser 630 that will come directly to the NAT 902 from the NAT 904 rather via the implied relay server.

In FIG. 9B, the browser 630 sends a BOP to the endpoint server 629, as indicated by path 912. A purpose of the BOP of path 912 is to open a door in the NAT 904 to packets from the endpoint server 629 that will come directly to the NAT 904 from the NAT 902 rather via the implied relay server. Here, because it is symmetric, the NAT 904 will allocate/map a separate port (door) for use with the address/pair mapped to the endpoint server 629 by the NAT 902. As such, another purpose of the BOP of path 912 is that the endpoint server 629 records (as indicated by item 913) the address/source pair mapped by the NAT 904 to the browser 630.

In FIG. 9C, the endpoint server 629 sends a stream of packets (e.g., a video stream where the endpoint server 629 is an IP video camera) over a UDP type of P2P connection to the browser 630, as indicated by path 914. Because the door at the NAT 904 was previously opened via the BOP of path 912, the NAT 904 accepts the stream of packets of path 914.

Class V has three subsets of conditions to which FIGS. 10A-12 correspond.

The second subset (of the three) will be discussed first in terms of FIGS. 10A-10C. The second (of three) subsets of conditions of Class V, referred to as subclass $V_2$, is:

| endpoint server side | Port restricted-cone NAT |
| browser side | Symmetric NAT |

Figure 10A:
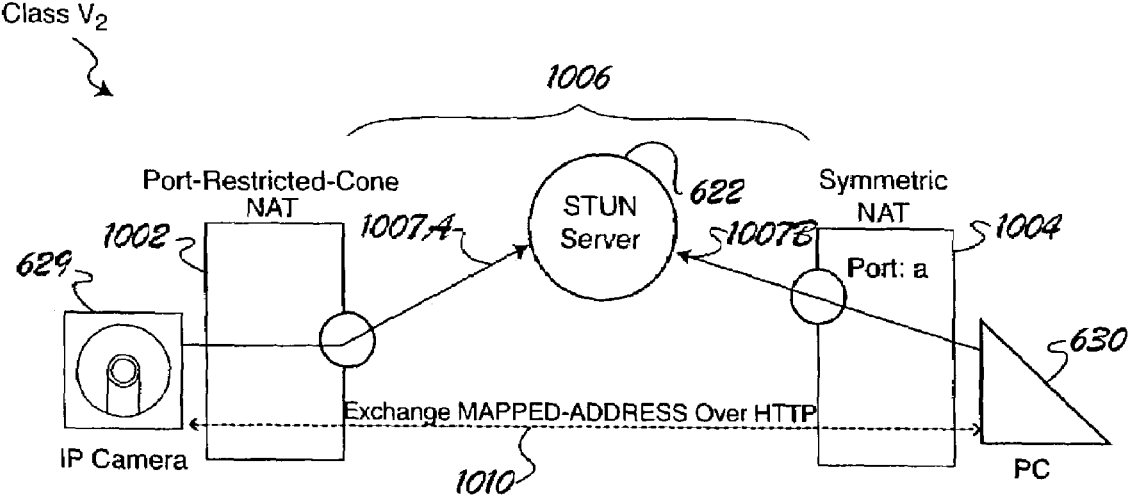
Figure 10B:
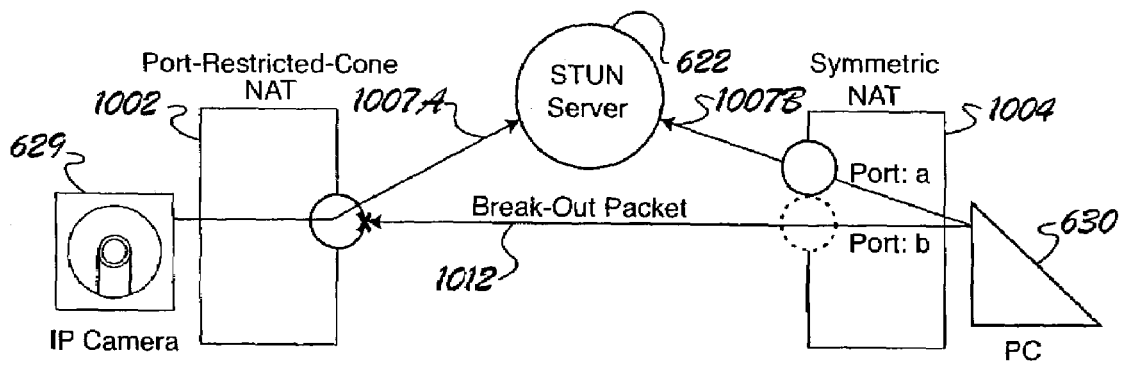
Figure 10C:
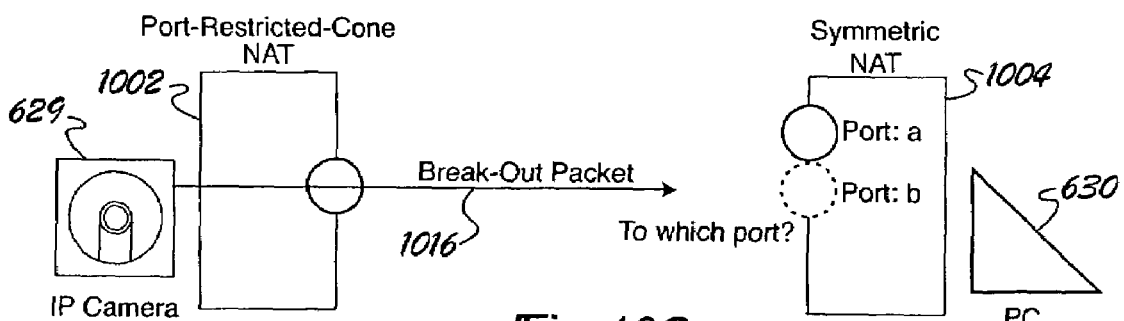

To further the context of the explanation, FIGS. 10A-10C assume that: the endpoint server 629 connects to an IP network 1006 (that includes the implied relay server and the NAT-discovery server 622) via a NAT 1002 that is of the port-restricted cone type; and the browser 630 connects to the network 1006 via a symmetric NAT 1004.

In FIG. 10A, the endpoint server 629 communicates with the NAT-discovery server 622 (via the NAT 1002) to determine the address/port pair mapped by the NAT 1002 to the endpoint server 629 and what type the NAT 1002 is, as indicated by path 1007A. Similarly, the browser 630 communicates with the NAT-discovery server 622 (via the NAT 1004) to determine the address/port pair mapped by the NAT 1004 to the browser 630 and what type the NAT 1004 is, as indicated by path 1007B.

A path 1010 indicates that: the endpoint server 629 receives from the browser 630 (via the NAT 1004, the implied relay server and the NAT 1002) information regarding the address/port pair mapped by the NAT 1004 to the browser 630 and what type the NAT 1004 is; and the browser 630 receives from the endpoint server 629 (via the NAT 1002, the implied relay server and the NAT 1004) information regarding the address/port pair mapped by the NAT 1002 to the endpoint server 629 and what type the NAT 1002 is. For simplicity, it is assumed that port:a was mapped by the NAT 1004 to the browser 630. The symmetric nature of the NAT 1004 should be kept in mind, i.e., only packets having as a source address the address/port pair of the NAT-discovery server 622 will be accepted at port:a by the symmetric NAT 1004.

In FIG. 10B, the browser 630 sends a break-out packet ("BOP") to the endpoint server 629 that goes from the NAT 1004 to the NAT 1002 without going via the implied relay server, as indicated by path 1012. A purpose of the BOP of path 1012 is to open a door in the symmetric NAT 1004 to packets from the endpoint server 629 that will come directly to the symmetric NAT 1004 from the NAT 1002 rather than by way of the implied relay server. Here, because it is symmetric, the NAT 1004 will allocate/map a separate port (door), e.g., port:b, for use with the address/pair mapped to the endpoint server 629 by the NAT 1002.

The port-restricted NAT 1002 blocks the packet of path 1012 because a packet has not yet been sent via the NAT 1002 from the endpoint server 629 to port:b of the symmetric NAT 1004 (which is the port allocated to the browser 630 by the NAT 1004 for use with the endpoint server 629). Because the NAT 1002 is of the port-restricted type, the packet previously sent via the NAT 1002 from the endpoint server 629 to port:a of the NAT 1004 (which is a port allocated to the browser 630 by the symmetric NAT 1004, albeit for use with the address/port pair of the implied relay server) will not open the door to a packet from the browser 630 sent via port:b of the symmetric NAT 1004.

Because the packet of path 1012 was blocked by the NAT 1002, the endpoint server 629 was not able to examine the packet and so is not able to determine what port has been assigned by the symmetric NAT 1004 to the browser 630 for packets from the endpoint server 629 that will come directly to the symmetric NAT 1004 from the NAT 1002 rather than by way of the implied relay server. In FIG. 10C, the attempt by the endpoint server 629 to send a BOP to the browser 630 fails, as indicated by path 1016 not reaching the symmetric NAT 104, because the endpoint server 629 does not know that it is port:b which the endpoint server 629 should be using.

Until the endpoint server 629 can successfully send BOP corresponding to path 1016, endpoint server 629 will not be able to send a stream of packets (e.g., a video stream where the endpoint server 629 is an IP video camera) over a UDP type of P2P connection to the browser 630. A technique to overcome this problem is discussed below.

Again, class V has three subsets of conditions. The first subset (of the three) will now be discussed in terms of FIG. 11.

The first (of three) subsets of conditions of Class V, referred to as subclass $V_1$, is:

| endpoint server side | Symmetric NAT |
| browser side | Port restricted-cone NAT |

Figure 11:
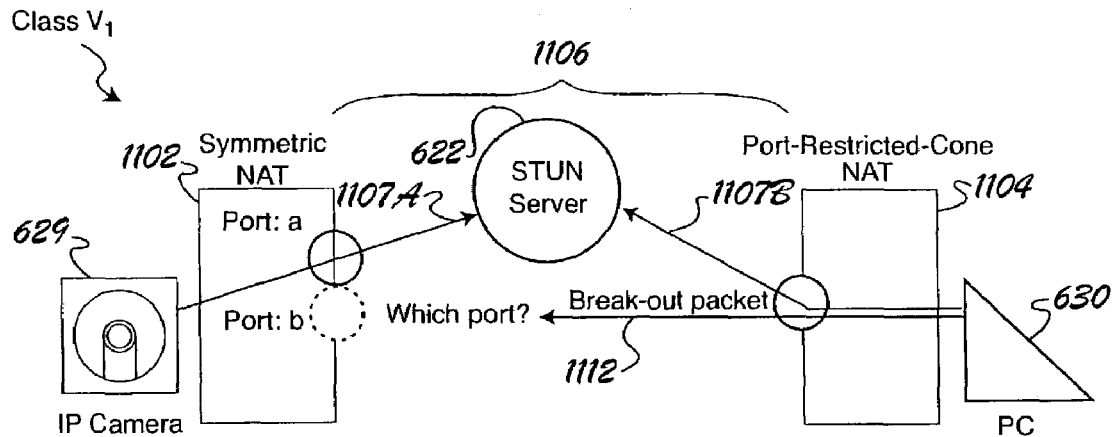

To further the context of the explanation, FIG. 11 assumes that: the endpoint server 629 connects to an IP network 1106 (that includes the implied relay server and the NAT-discovery server 622) via a symmetric NAT 1102; and the browser 630 connects to the network 1106 via a NAT 1104 that is of the port-restricted cone type.

In FIG. 11, the endpoint server 629 communicates with the NAT-discovery server 622 (via the NAT 1102) to determine the address/port pair mapped by the NAT 1102 to the endpoint server 629 and what type the NAT 1102 is, as indicated by path 1107A. Similarly, the browser 630 communicates with the NAT-discovery server 622 (via the NAT 1104) to determine the address/port pair mapped by the NAT 1104 to the browser 630 and what type the NAT 1104 is, as indicated by path 1107B.

Similar to path 1010 of FIG. 10A (though a corresponding path is not depicted in FIG. 11 for brevity), the following occurs: the endpoint server 629 receives from the browser 630 (via the NAT 1104, the implied relay server and the NAT 1102) information regarding the address/port pair mapped by the NAT 1104 to the browser 630 and what type the NAT 1104 is; and the browser 630 receives from the endpoint server 629 (via the NAT 1102, the implied relay server and the NAT 1104) information regarding the address/port pair mapped by the NAT 1102 to the endpoint server 629 and what type the NAT 1102 is.

For simplicity, it is assumed that port:a was mapped by the NAT 1102 to the endpoint server 629 for use with the NAT-discovery server 622. The symmetric nature of the NAT 1104 should be kept in mind, i.e., only packets having as a source address the address/port pair of the NAT-discovery server 622 will be accepted at port:a by the symmetric NAT 1102.

In FIG. 11, the browser 630 would like to send a BOP to the endpoint server 629, as indicated by path 1112. A purpose of the BOP of path 1112 would be to open the door in the port-restricted NAT 1104 to packets from the endpoint server 629 that will come directly to the port-restricted NAT 1104 from the NAT 1102 rather than by way of the implied relay server. But the browser 630 knows that the NAT 1102 is a symmetric NAT which will assign a port other than port:a for use with packets from it (the browser 630) that will come directly to the symmetric NAT 1102 from the NAT 1104 rather than by way of the implied relay server. Unfortunately, the browser 630 only knows of port:a, at which only packets from the address/port pair of the NAT-discovery server 622 are accepted by the symmetric NAT 1102. Thus, the browser 630 is prevented from actually sending the BOP of path 1112.

In FIG. 11, the attempt by the browser 630 to send a BOP to the endpoint server 629 fails, as indicated by path 1112 not reaching the symmetric NAT 104, because the endpoint server 629 does not know that it is port:b to which it (the endpoint server 629) should be sending.

Until the browser 630 can successfully send BOP corresponding to path 1112, the endpoint server 629 will not be able to send a stream of packets (e.g., a video stream where the endpoint server 629 is an IP video camera) over a UDP type of P2P connection to the browser 630 because the door/port on the NAT 1104 will not be open to packets coming from the endpoint sever 629 by way of port:b of the NAT 102. A technique to overcome this problem is discussed below.

Yet again, class V has three subsets of conditions. The third subset (of the three) will now be discussed in terms of FIG. 12.

The third (of three) subset of conditions of Class V, referred to as subclass $V_3$, is:

| | |
|---|---|
| endpoint server side | Symmetric NAT |
| browser side | Symmetric NAT |

Figure 12:
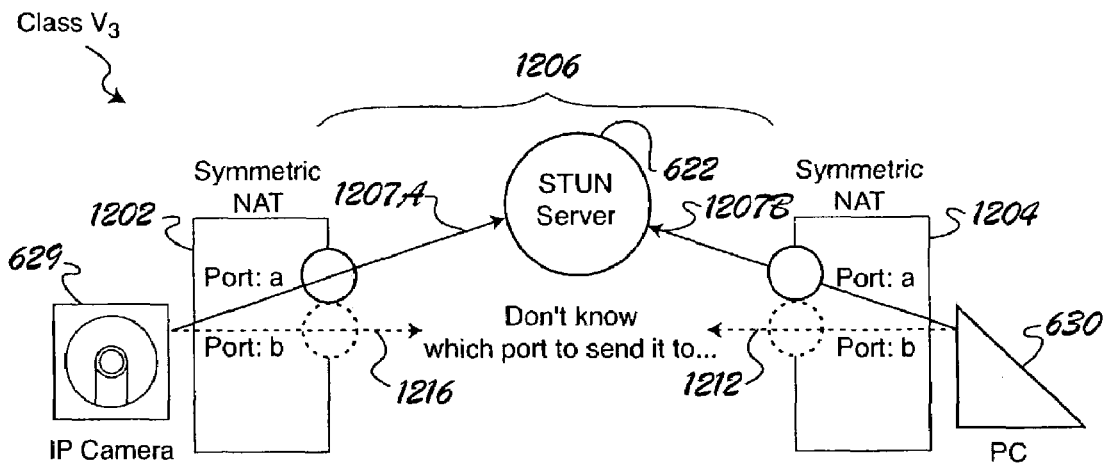

To further the context of the explanation, FIG. 12 assumes that: the endpoint server 629 connects to an IP network 1206 (that includes the implied relay server and the NAT-discovery server 622) via a symmetric NAT 1202; and the browser 630 connects to the network 1206 via a symmetric NAT 1204.

In FIG. 12, the endpoint server 629 communicates with the NAT-discovery server 622 (via the NAT 1202) to determine the address/port pair mapped by the NAT 1202 to the endpoint server 629 and what type the NAT 1202 is, as indicated by path 1207A. Similarly, the browser 630 communicates with the NAT-discovery server 622 (via the NAT 1204) to determine the address/port pair mapped by the NAT 1204 to the browser 630 and what type the NAT 1204 is, as indicated by path 1207B.

Similar to path 1010 of FIG. 10A (though a corresponding path is not depicted in FIG. 12 for brevity), the following occurs: the endpoint server 629 receives from the browser 630 (via the NAT 1204, the implied relay server and the NAT 1202) information regarding the address/port pair mapped by the NAT 1204 to the browser 630 and what type the NAT 1204 is; and the browser 630 receives from the endpoint server 629 (via the NAT 1202, the implied relay server and the NAT 1204) information regarding the address/port pair mapped by the NAT 1202 to the endpoint server 629 and what type the NAT 1202 is.

For simplicity, it is assumed that port:a was mapped by the NAT 1202 to the endpoint server 629 for use with the implied relay server and, similarly, port:a was mapped by the NAT 1204 to the browser 630 for use with the implied relay server. The symmetric nature of the NATs 1202 and 1204 should be kept in mind, i.e., only packets having as a source address the address/port pair of the NAT-discovery server 622 will be accepted at port:a by each of the symmetric NATs 1202 and 1204.

Similar to what is described above relative to path 1112 of FIG. 11, the attempt by the browser 630 to send a BOP to the endpoint server 629 fails, as indicated by path 1212. The circumstance of path 1212 is sufficient to prevent the endpoint server 629 from sending a stream of packets (e.g., a video stream where the endpoint server 629 is an IP video camera) over a UDP type of P2P connection to the browser 630. There is a further problem of subclass $V_3$ to be overcome.

In FIG. 12, the endpoint server 629 would also like to send a send a stream of packets (e.g., again, a video stream where the endpoint server 629 is an IP video camera) over a UDP type of P2P connection to the browser 630. But the endpoint server 629 knows that the NAT 11204 is a symmetric NAT which will assign a port other than port:a for use with packets from it (the endpoint server 629) that will come directly to the symmetric NAT 1202 from the NAT 1204 (such as with the P2P connection) rather than by way of the implied relay server. Unfortunately, the endpoint server 629 only knows of port:a, at which only packets from the address/port pair of the NAT-discovery server 622 are accepted by the symmetric NAT 1204.

In FIG. 12, the attempt by the endpoint server 629 to make the P2P connection to the browser 630 fails, as indicated by path 1216 not reaching the symmetric NAT 104, because the endpoint server 629 does not know that it is port:b to which it (the endpoint server 629) should be sending.

Until the endpoint server 629 can determine the port on the NAT 1204 that it (the endpoint server 629) should use to make a P2P connection, the endpoint server 629 will be prevented from making the P2P connection. A technique to overcome this problem is discussed below.

In the context of a first endpoint device, its associated NAT (the "first NAT"), a counterpart endpoint device and its counterpart NAT (that happens to be a symmetric NAT), an embodiment of the invention, in part, is a recognition of the following: the otherwise unknown particular identification number ("ID") of a port which will be assigned/mapped/bound to the counterpart endpoint device by the counterpart symmetric NAT (see the problems of subclasses $V_1$, $V_2$ and $V_3$ discussed above) can be predicted; and, accordingly, BOPs can be sent to predicted port IDs of the counterpart symmetric NAT by the first endpoint device via the first NAT in order to open doors in the first NAT in anticipation of receiving packets sourced through the predicted port IDs of the counterpart NAT.

An embodiment of the invention, in part, is the recognition that symmetric NATs assign/map ports, i.e., bind a particular port ID to an IP address or address/port pair, using a substantially constant increment size ($\Delta p$).

Figure 4A:
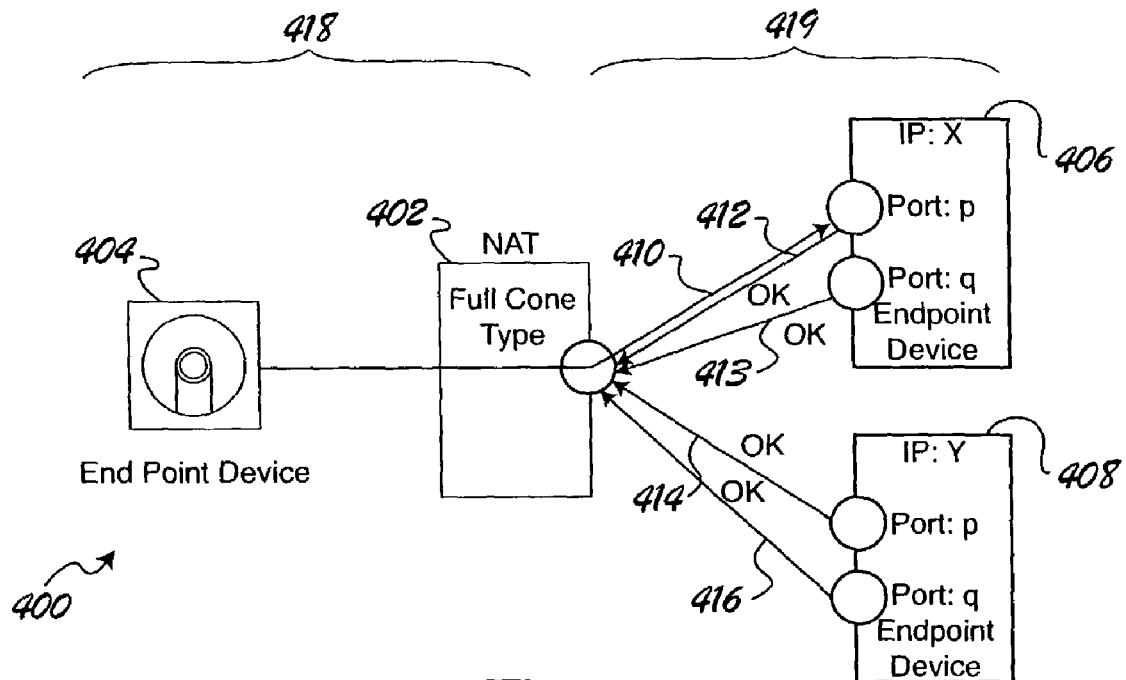
FIGS. 4A-4E are block diagram depictions of various types of NATs according to the Background Art.
Figure 4B:
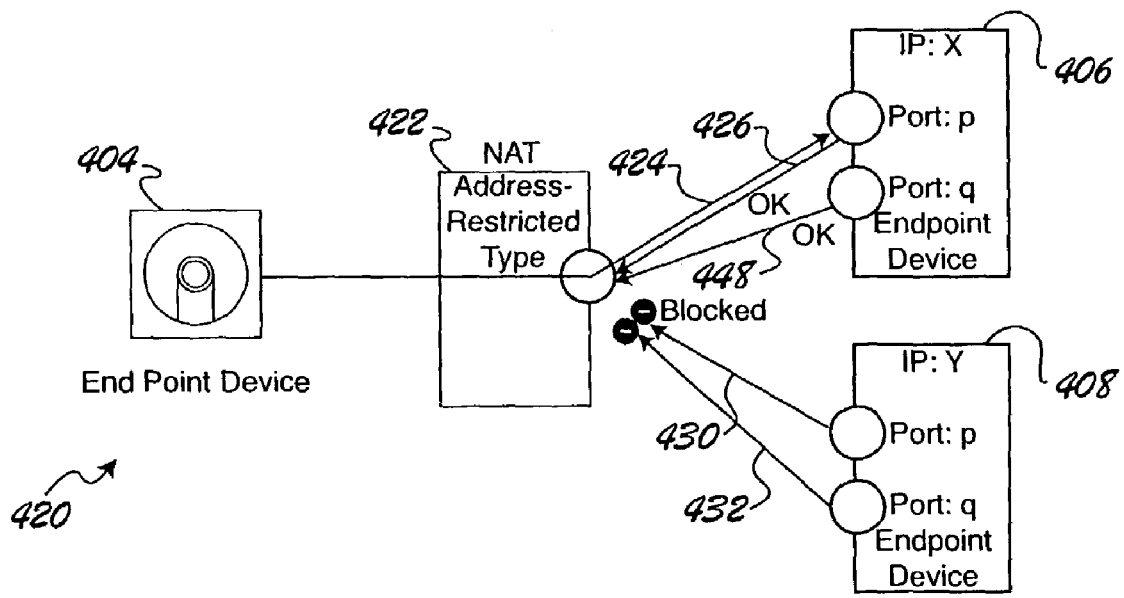
Figure 4C:
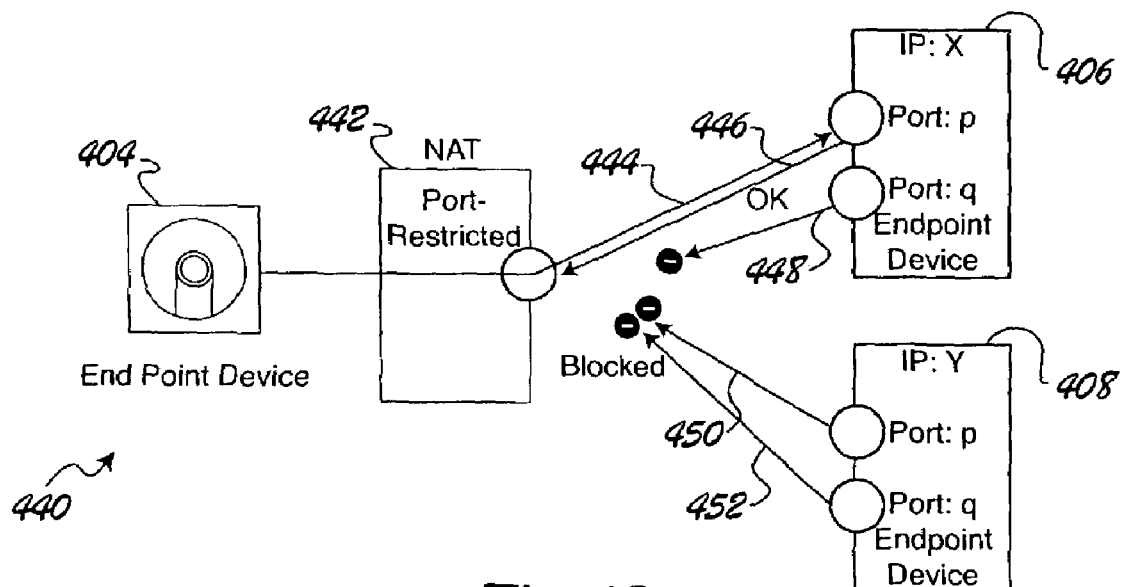
Figure 4D:
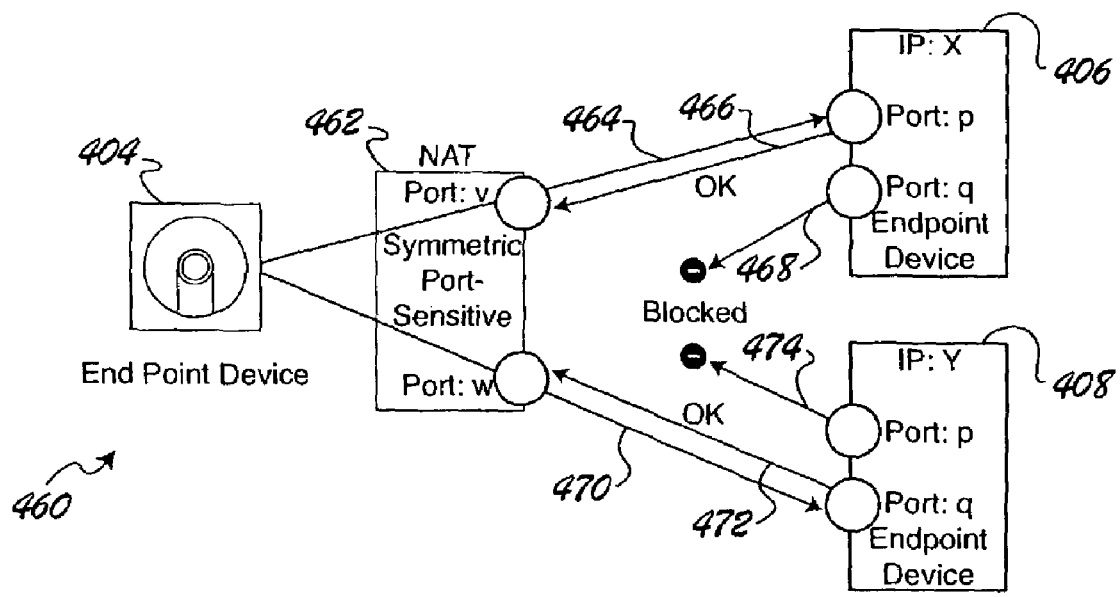

An embodiment of the invention provides a method to determine the substantially constant increment size ($\Delta p$) of a port-sensitive symmetric NAT, e.g., $SIM_S$ NAT 462 of Background Art FIG. 4D. Such a method will be explained in terms of FIG. 13A. It is noted that such a method can be applied to a negative increment size, i.e., a decrement size.

Figure 13A:
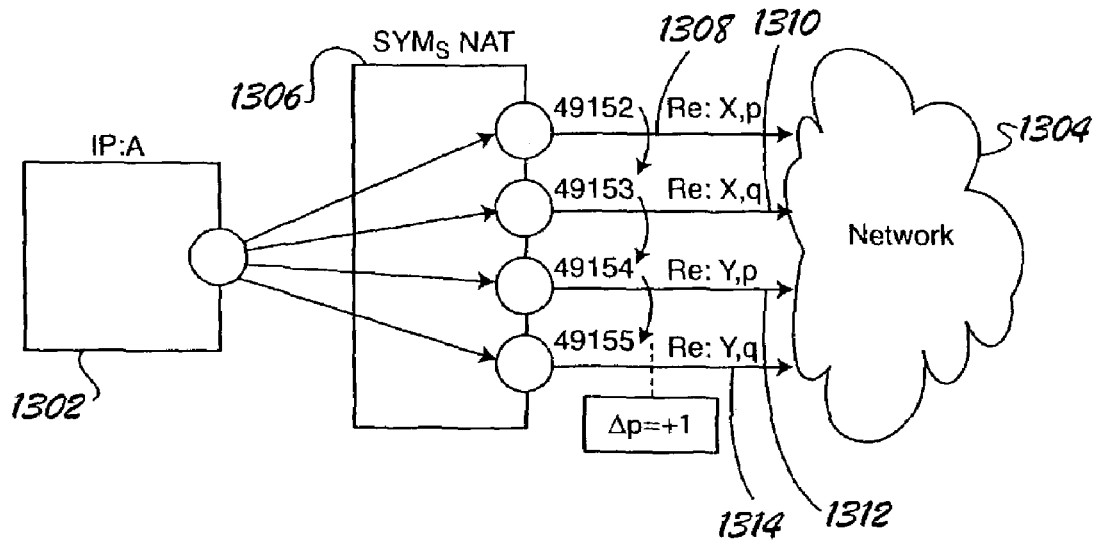

In FIG. 13A, an endpoint device 1302, e.g., such as the endpoint device 629 or the browser 630, connects to a network 1304 via a $SIM_S$ NAT 1306. The endpoint device 1302 will determine the increment size ($\Delta p$) by discovering the port IDs which the $SIM_S$ NAT 1306 allocates/maps (or binds) to various destination address/port pairs to which the endpoint device 1302 attempts to send test packets; and then calculating the differences between successive ones of the port IDs. If a consistent value among the differences emerges, then this number can be treated as the increment size ($\Delta p$). The endpoint device 1302 can discover the port IDs by performing a NAT-discovery process, as e.g., a STUN test, in conjunction with a NAT discover server such as the NAT-discovery server 622.

The endpoint device 1302 sends packets via the $SIM_S$ NAT 1306 to destinations in the network 1304 having the address/port pairs X,p (as indicated by arrow 1308), X,q (as indicated by arrow 1310), Y,p (as indicated by arrow 1312) and Y,q (as indicated by arrow 1314). To simplify the explanation, example port IDs will be assumed for the ports of the $SIM_S$ NAT 1306 allocated/mapped/bound to the destinations of 1308-1314, namely: port 49152 for destination X,p (path 1308); port 49153 for destination X,q (path 1310); port 49154 for destination Y,p (path 1312); and port 49155 for destination Y,q (path 1314). Here, the differences between successive ones of the port IDs are always one, hence $\Delta p=1$. In actuality, $\Delta p$ can be 1, or 2 or a greater integer.

Also, it is noted that the destination X,p of path 1308 and the destination X,q of path 1310 differ only in port number, which is also true of destinations Y,p (path 1312) and Y,q (path 1314). Because associated port IDs (namely 49152 & 49153 and 49154 & 49155, respectively) are different, the endpoint device will recognize the symmetric NAT 1302 as a $SIM_S$ type of NAT. This knowledge is useful because, where a counterpart NAT is the $SIM_S$-type, there is little benefit (in effect) to the endpoint device 1302 sending more than one prediction-based BOP, as will be discussed in more detail below.

Figure 4E:
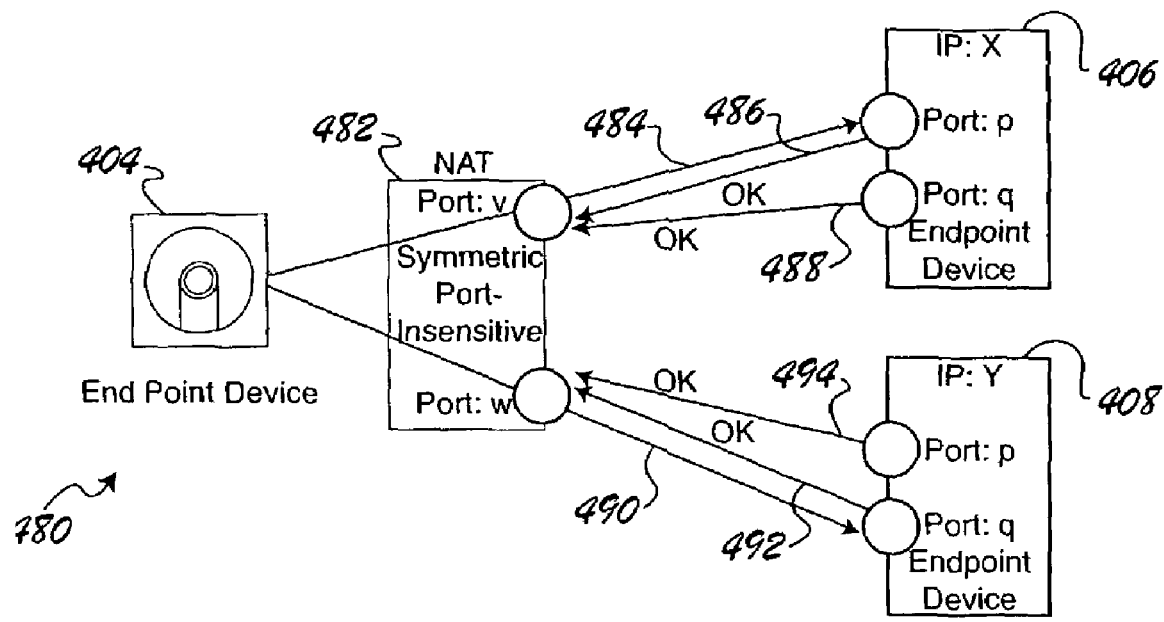

Another embodiment of the invention provides a method to determine the substantially constant increment size ($\Delta p$) of a port-insensitive symmetric NAT, e.g., $SYM_I$ NAT 482 of Background Art FIG. 4E. Such a method will be explained in terms of FIG. 13B.

Figure 13B:
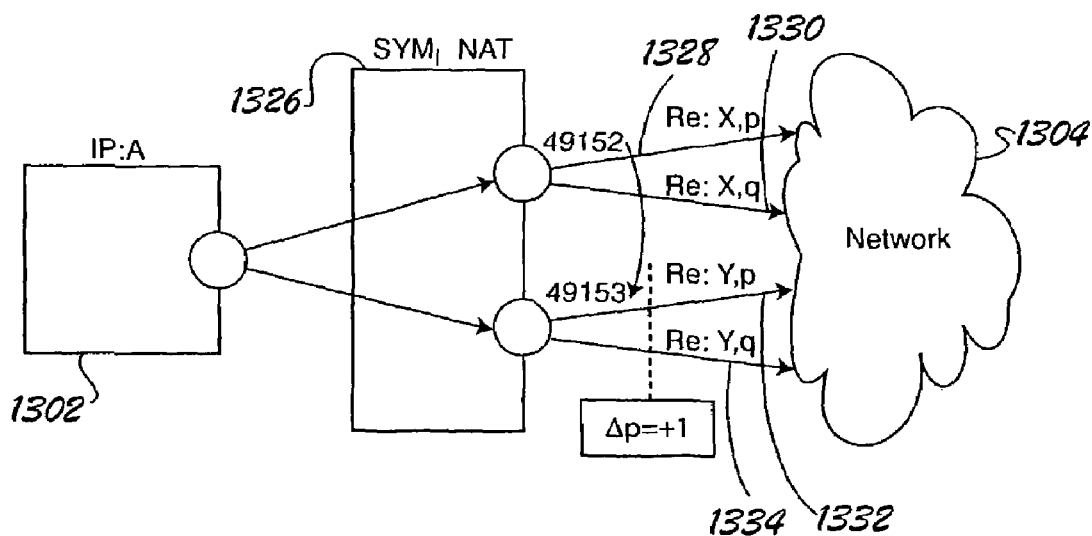

FIG. 13B is similar to FIG. 13A except that the $SIM_S$ NAT 1326 has been replaced with a $SYM_I$ NAT 1326. The endpoint device 1302 will determine the increment size ($\Delta p$) as before by discovering and analyzing the port IDs which the $SYM_I$ NAT 1326 allocates/maps (or binds) to various destination address/port pairs to which the endpoint device attempts to send test packets.

The endpoint device 1302 again sends packets via the $SIM_S$ NAT 1326 to destinations in the network 1304 having the address/port pairs X,p (as indicated by arrow 1328), X,q (as indicated by arrow 1330), Y,p (as indicated by arrow 1332) and Y,q (as indicated by arrow 1334). To simplify the explanation, again example port IDs will be assumed for the ports of the $SYM_I$ NAT 1326 allocated/mapped/bound to the destinations of 1328-1334, namely: port 49152 for destinations X,p (path 1328) and X,q (path 1330); and port 49153 for destinations Y,p (path 1332) and Y,q (path 1334).

For the $SIM_S$ NAT 1326, there is no difference in port ID for different ports at the same destination address, namely X,p (path 1328) and X,q (path 1330) have port 49152,; and Y,p (path 1332) and Y,q (path 1334) have the same port 49153. But port 49152 for destinations having address X (paths 1328 and 1330) differs by one from port 49153 for destinations having address Y (paths 1332 and 1334). As such, the endpoint device 1302 will determine that $\Delta p=1$. In actuality, $\Delta p$ can be 1, or 2 or a greater integer. Also, the endpoint device 1302 will recognize the symmetric NAT 1326 as a $SYM_I$ type of NAT. This knowledge is useful because, where a counterpart NAT is the $SYM_I$-type, there can be significant benefit to the endpoint device 1302 sending more than one prediction-based break-out packet ("BOP"), as will be discussed in more detail below.

When the endpoint device 1302 receives information indicating that a NAT (not depicted) associated with another endpoint device (not depicted) (hereafter the "counterpart NAT" associated with the "counterpart endpoint device") is a $SIM_S$ or $SYM_I$ type of NAT, the endpoint device 1302 will also be provided with the estimate of the counterpart NAT's $\Delta p$. The endpoint device 1302 predicts port numbers at the counterpart symmetric NAT, in succession, by adding $\Delta p$ to the port ID mapped by the counterpart symmetric NAT to the counterpart endpoint device.

There will be a time lag between when the counterpart NAT allocates/maps/binds a port number (the "previous" port number) to the counterpart endpoint device for use with the NAT-discovery server 622 and when the counterpart NAT allocates/maps/binds a port number to the counterpart endpoint device for use with the endpoint device 1302. During the time lag, the counterpart NAT might allocate/map/bind one or more successive port IDs to one or more applications other than the counterpart endpoint device might create another binding on the same Symmetric NAT.

This creates a problem that the next port number to be assigned by the counterpart NAT for use relative to the endpoint device 1302 might not be +1 to the previous port number, but instead +2 or greater. To minimize the effect of this problem, the counterpart endpoint device can be configured to minimize a delay between when it receives information about the NAT (the "home NAT") associated with the endpoint device 1302 and when a port ID on the counterpart NAT is allocated/mapped/bound for use with the endpoint device 1302 exclusive of a relay server.

The port ID assigned by a NAT typically lies within a predetermined port range, e.g., 0×C000 to 0×CFFF (hexadecimal notation). Occasionally, as a symmetric NAT assigns subsequent port IDs, the symmetric NAT will reach the upper boundary 0×CFFF. Because port IDs can be recycled, then the symmetric NAT will recycle to the beginning of the address range (0×C000) in order to obtain available port IDs. But the difference between a port ID at the end of the range and a port ID at the beginning of the range is enormous. In this situation, the NAT will treat the difference as an anomaly and will repeat the $\Delta p$ determination process.

If the port ID at the counterpart NAT that is mapped/bound to the counterpart endpoint device is not what the endpoint device 1302 predicted, the result is that the endpoint device 1302 will send a prediction-based packet either (i) to an unbound port ID of the counterpart NAT, or (ii) to a port ID mapped/bound to an application other than the counterpart endpoint device or (iii) to a port mapped/bound to the counterpart endpoint device albeit for use relative to a different port ID of the home NAT. In case (i), the sent packet will be discarded by the counterpart NAT because there is no such port ID has been mapped/bound. In case (ii) and (iii), where the counterpart NAT is of the symmetric type (which does not receive an incoming packet from an unknown IP address and/or port number), the prediction-based packet will be discarded by the counterpart NAT and should have no affect on the counterpart endpoint device or the other applications.

Next, prediction-based P2P connection facilitation will be discussed for subclass $V_1$ in terms of FIGS. 14A-14C.

Figure 14A:
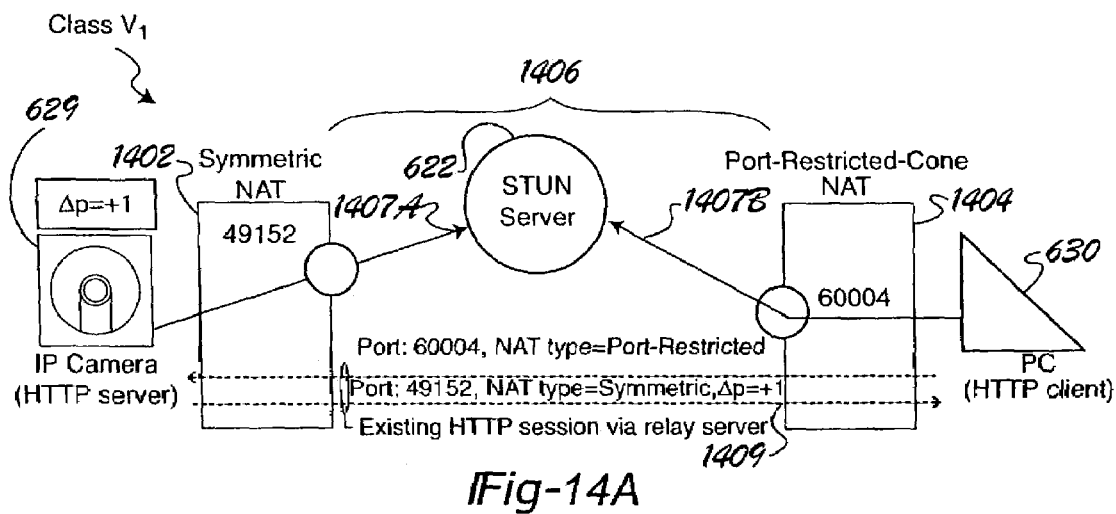

To further the context of the explanation, FIG. 14A assumes that: the endpoint server 629 connects to an IP network 1406 (that includes the implied relay server and the NAT-discovery server 622) via a symmetric NAT 1402; and the browser 630 connects to the network 1406 via a NAT 1404 that is of the port-restricted cone type. It should be observed that FIG. 14A is similar to FIG. 11. Here, also to further the explanation, example port IDs and a value for $\Delta p$ are assumed which should not be viewed as limiting the scope of this disclosure.

In FIG. 14A, the endpoint server 629 communicates with the NAT-discovery server 622 (via the NAT 1402) to determine the address/port pair (for example, the port ID is 49152) mapped by the NAT 1402 to the endpoint server 629, what type the NAT 1402 is and the increment size, $\Delta p$ (here, $\Delta p=+1$), as indicated by path 1407A. Similarly, the browser 630 communicates with the NAT-discovery server 622 (via the NAT 1404) to determine the address/port pair (here, the port ID is 60004) mapped by the NAT 1404 to the browser 630 and what type the NAT 1404 is, as indicated by path 1407B.

The endpoint server 629 receives from the browser 630 (via the NAT 1404, the implied relay server and the NAT 1402) information regarding the address/port pair mapped by the NAT 1404 to the browser 630 and what type the NAT 1404 is, as indicated by path 1408. The browser 630 receives from the endpoint server 629 (via the NAT 1402, the implied relay server and the NAT 1404) information regarding the address/port pair mapped by the NAT 1402 to the endpoint server 629 and what type the NAT 1402 is (including $\Delta p$), as depicted by path 1410.

Figure 14B:
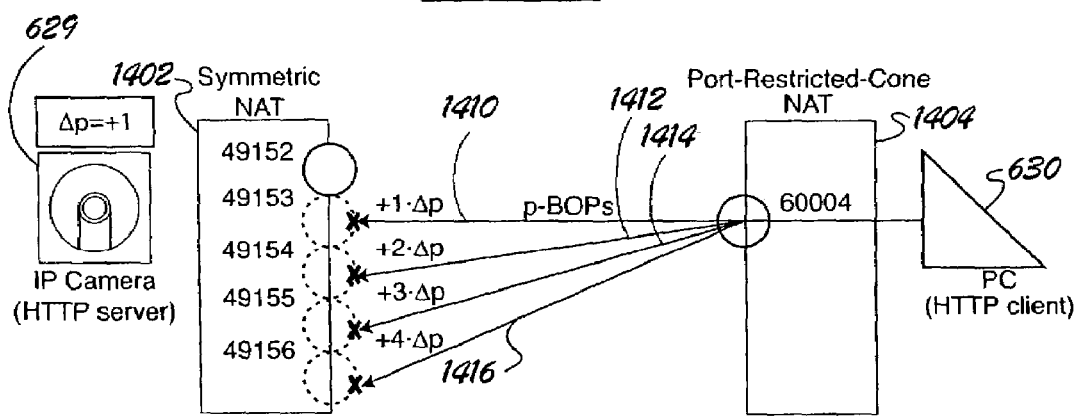
Figure 14C:
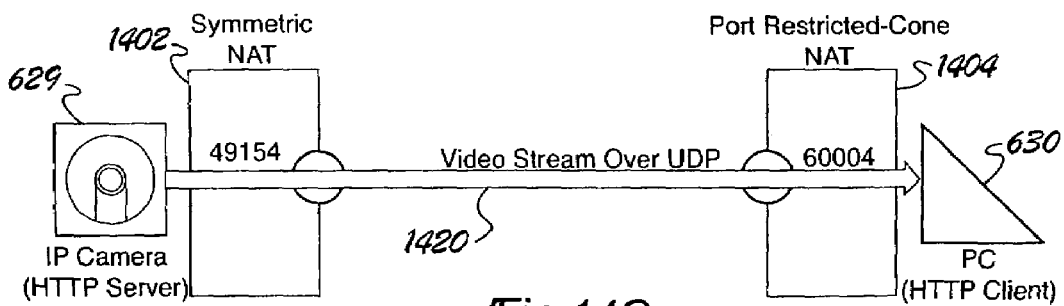

In FIG. 14B, the browser 630 would like to send one or more break-out packets ("BOPs") to the endpoint server 629. A purpose of the BOP of path 1412 would be to open the door in the port-restricted NAT 1404 to packets from the endpoint server 629 that will come directly to the port-restricted NAT 1404 from the NAT 1402 rather than by way of the implied relay server. But the endpoint server 629 knows that the NAT 1404 is a symmetric NAT which will assign a new port ID other than port ID=49152 for use with packets from it (the endpoint server 629) that will come directly to the symmetric NAT 1404 from the NAT 1402 rather than by way of the implied relay server. Using the knowledge that $\Delta p=+1$ for the NAT 1504, the endpoint server 629 can predict a possible value of the new port ID. To improve the chances of successfully predicting the new port ID, the browser 630 can make more than one prediction. Then, the browser 630 can generate one or more corresponding multiple prediction-based BOPs ("p-BOPs").

The browser 630 predicts port IDs and sends corresponding p-BOPs as follows: port ID 49153 over path 1410; port ID 49154 over path 1412; port ID 49155 over path 1414; and port ID 49156 over path 1416. The p-BOPs of paths 1410-1416 are blocked because the symmetric NAT 1402 has not yet sent a packet directly to port 6004 of the NAT 1404. But that does not thwart the purpose of the p-BOPs because a purpose of their being sent is to open the port 60004 in the NAT 1404 to packets from the endpoint server 629 sent via the predicted ports of the NAT 1402.

Continuing in terms of the example port IDs, it is assumed that the NAT 1402 assigns port ID 49154 for use with packets coming/going directly between the port-restricted NAT 1404 and the NAT 1402 rather than by way of the implied relay server. Port ID 49154 corresponds to the packet of path 1412, hence door (port ID 60004) at the NAT 1404 is already open to packets originating through port ID 49154 that do not arrive by way of the implied relay server. As such, in FIG. 14C, the endpoint server 629 sends a stream of packets (e.g., a video stream where the endpoint server 629 is an IP video camera) over a UDP type of P2P connection to the browser 630, as indicated by path 1420.

Next, prediction-based P2P connection facilitation will be discussed for subclass $V_2$ in terms of FIGS. 15A-15C.

Figure 15A:
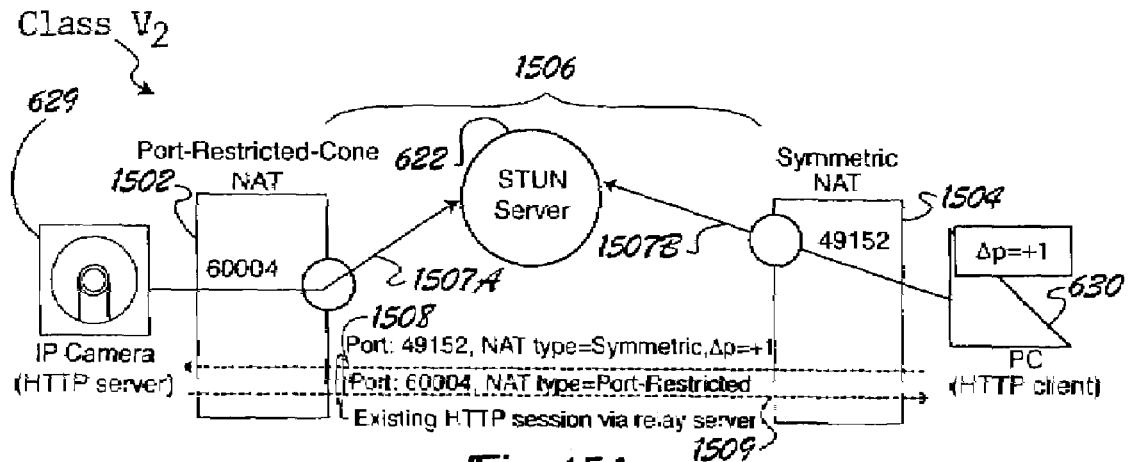

To further the context of the explanation, FIG. 15A assumes that: the endpoint server 629 connects to an IP network 1506 (that includes the implied relay server and the NAT-discovery server 622) via a port-restricted cone type NAT 1502; and the browser 630 connects to the network 1506 via a symmetric NAT 1504. It should be observed that FIG. 15A is similar to FIG. 10A. Here, also to further the explanation, example port IDs and a value for $\Delta p$ are assumed which should not be viewed as limiting the scope of this disclosure.

In FIG. 15A, the endpoint server 629 communicates with the NAT-discovery server 622 (via the NAT 1502) to determine the address/port pair (for example, the port ID is 60004) mapped by the NAT 1502 to the endpoint server 629, what type the NAT 1502 is, as indicated by path 1507A. Similarly, the browser 630 communicates with the NAT-discovery server 622 (via the NAT 1504) to determine the address/port pair (here, the port ID is 49152) mapped by the NAT 1504 to the browser 630 and what type the NAT 1504 is and the increment size, $\Delta p$ (here, $\Delta p=+1$), as indicated by path 1507B.

The endpoint server 629 receives from the browser 630 (via the NAT 1504, the implied relay server and the NAT 1502) information regarding the address/port pair mapped by the NAT 1504 to the browser 630 and what type the NAT 1504 is (including $\Delta p$), as indicated by path 1508. The browser 630 receives from the endpoint server 629 (via the NAT 1502, the implied relay server and the NAT 1504) information regarding the address/port pair mapped by the NAT 1502 to the endpoint server 629 and what type the NAT 1502 is, as depicted by path 1510.

Figure 15B:
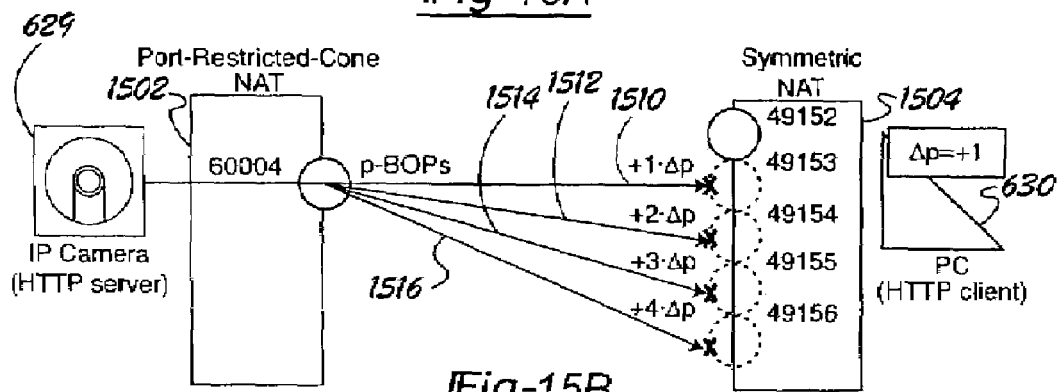
Figure 15C:
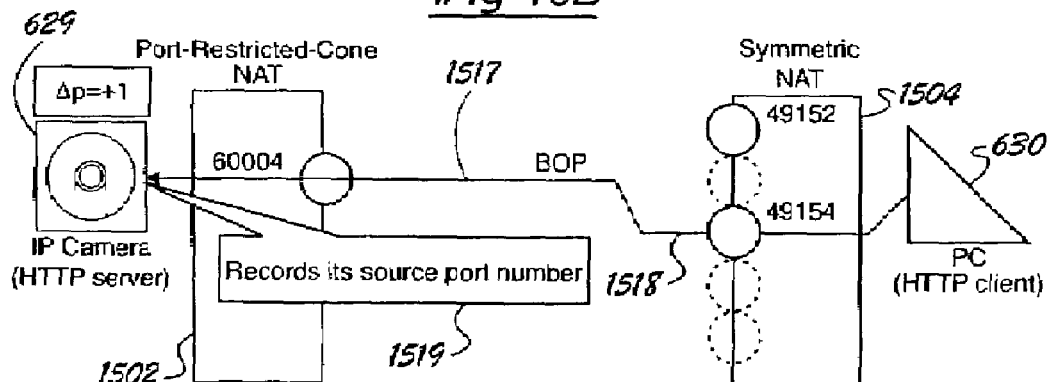
Figure 15D:
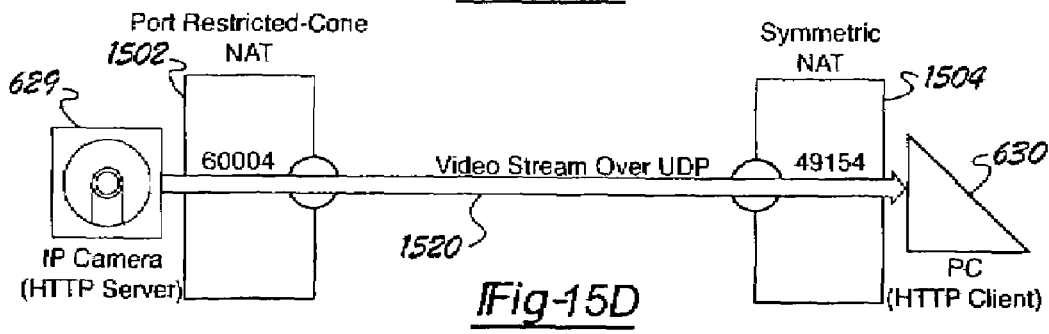

In FIG. 15B, the endpoint server 629 would like to send a break-out packet ("BOP") to the endpoint server 629, as indicated by path 1512. A purpose of the BOP of path 1512 would be to open the door in the port-restricted NAT 1502 to packets from the browser 630 that will come directly to the port-restricted NAT 1502 from the NAT 1504 rather than by way of the implied relay server. But the endpoint server 629 knows that the NAT 1504 is a symmetric NAT which will assign a new port ID other than port ID=49152 for use with packets from it (the endpoint server 629) that will come directly to the symmetric NAT 1504 from the NAT 1502 rather than by way of the implied relay server. Using the knowledge that $\Delta p=+1$ for the NAT 1504, the browser 630 can predict a possible value of the new port ID. To improve the chances of successfully predicting the new port ID, the browser 630 can make more than one prediction. Then, the browser can generate one or more corresponding multiple prediction-based BOPs ("p-BOPs").

The endpoint server 629 predicts port IDs and sends corresponding p-BOPs as follows: port ID 49153 over path 1510; port ID 49154 over path 1512; port ID 49155 over path 1514; and port ID 49156 over path 1516. The p-BOPs of paths 1510-1516 are blocked because the symmetric NAT 1504 has not yet sent a packet directly to port 6004 of the NAT 1504. But that does not thwart the purpose of the p-BOPs because a purpose of their being sent is to open the existing port 60004 in the NAT 1502 to packets from the browser 630 sent via the predicted ports of the NAT 1504.

Continuing in terms of the example port IDs, it is assumed that the NAT 1504 assigns port ID 49154 for use with packets coming/going directly between the port-restricted NAT 1502 and the NAT 1504 rather than by way of the implied relay server. Port ID 49154 corresponds to the packet of path 1512, hence door (port ID 60004) at the NAT 1502 is already open to packets originating through port ID 49154 that do not arrive by way of the implied relay server. But the endpoint server 629 does not yet know which of its predictions was successful, i.e., which of the predicted ports 49153-49156 corresponds to the new port. In FIG. 15C, the browser 630 sends a break-out packet ("BOP") to the endpoint server 629, as indicated by path 1518. A purpose of the BOP of path 1518 would be to open the door (port ID 49154) in the symmetric NAT 1504 to packets from the endpoint server 629 that will come directly to the symmetric NAT 1504 from the NAT 1502 rather than by way of the implied relay server.

Upon receiving the p-BOP of path 1518, the endpoint server 629 records its port ID 49154 (and the IP address) for use in making a P2P connection with the browser 630, as indicated by item 1519. Then, in FIG. 15D, the endpoint server 629 sends a stream of packets (e.g., a video stream where the endpoint server 629 is an IP video camera) over a UDP type of P2P connection to the browser 630, as indicated by path 1520.

Next, prediction-based P2P connection facilitation will be discussed for subclass $V_3$. As there are two types of symmetric NAT as discussed above, namely $SYM_S$ and $SYM_I$, there are four sub-classes of sub-class $V_3$, i.e., four sub-sub-classes: $V_{3A}$; $V_{3B}$; $V_{3C}$; and $V_{3D}$. The following table, as an example, assumes that a first endpoint device is an endpoint server, e.g., 629, and that the second endpoint device is a browser, e.g., 630.

|  |  | Browser Side | |
| --- | --- | --- | --- |
|  |  | $SYM_I$ NAT | $SYM_S$ NAT |
| Endpoint | $SYM_I$ NAT | $V_{3A}$ | $V_{3C}$ |
| Server Side | $SYM_S$ NAT | $V_{3B}$ | $V_{3D}$ |

Sub-sub-class $V_{3A}$ will now be discussed in terms of FIGS. 16A-16D.

Figure 16A:
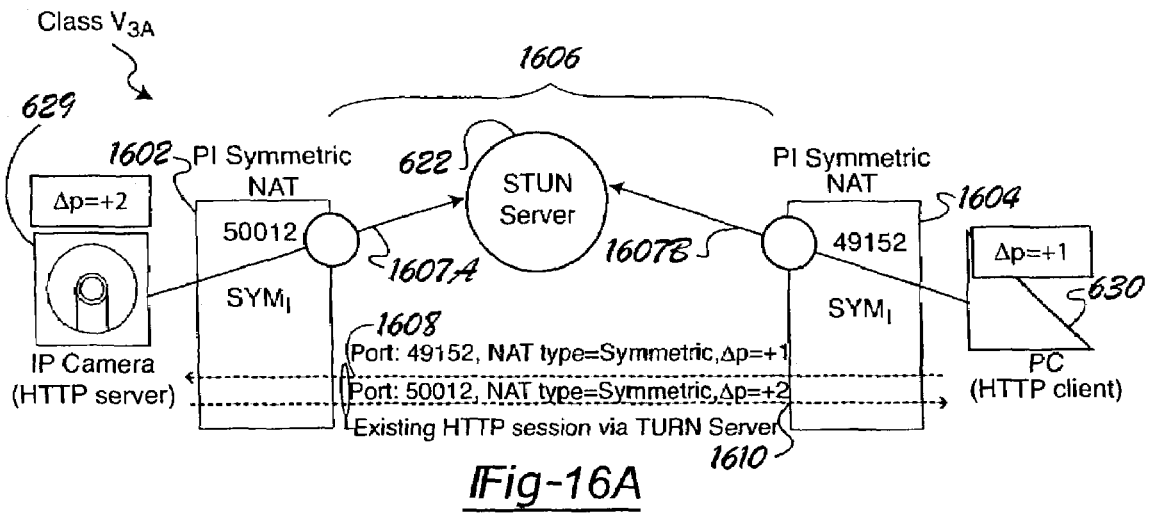

To further the context of the explanation, FIG. 16A assumes that: the endpoint server 629 connects to an IP network 1606 (that includes the implied relay server and the NAT-discovery server 622) via a port-insensitive symmetric ("$SYM_I$") NAT 1602; and the browser 630 connects to the network 1606 also via a $SYM_I$ NAT 1604. Here, also to further the explanation, example port IDs and a value for $\Delta p$ are assumed which should not be viewed as limiting the scope of this disclosure.

In FIG. 16A, the endpoint server 629 communicates with the NAT-discovery server 622 (via the NAT 1602) to determine the address/port pair (for example, the port ID is 50012) mapped by the NAT 1602 to the endpoint server 629, what type the NAT 1602 is and the increment size, $\Delta p$ (here, $\Delta p=+2$), as indicated by path 1607A. Similarly, the browser 630 communicates with the NAT-discovery server 622 (via the NAT 1604) to determine the address/port pair (here, the port ID is 49152) mapped by the NAT 1604 to the browser 630 and what type the NAT 1604 is and the increment size, $\Delta p$ (here, $\Delta p=+1$), as indicated by path 1607B.

The endpoint server 629 receives from the browser 630 (via the NAT 1604, the implied relay server and the NAT 1602) information regarding the address/port pair mapped by the NAT 1604 to the browser 630 and what type the NAT 1604 is (including $\Delta p$), as indicated by path 1608. The browser 630 receives from the endpoint server 629 (via the NAT 1602, the implied relay server and the NAT 1604) information regarding the address/port pair mapped by the NAT 1602 to the endpoint server 629 and what type the NAT 1602 is, as depicted by path 1610.

Figure 16B:
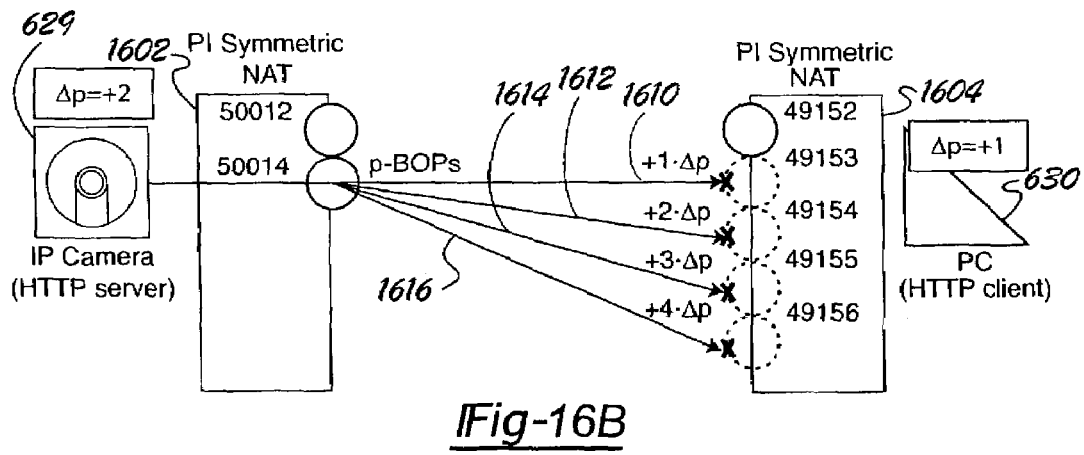

In FIG. 16B, the endpoint server 629 would like to send a break-out packet ("BOP") to the browser 630. A purpose of such a BOP would be to open the door in the $SYM_I$ NAT 1602 to packets from the browser 630 that will come directly to the $SYM_I$ NAT 1602 from the NAT 1604 rather than by way of the implied relay server. But the endpoint server 629 knows that the NAT 1604 is a symmetric NAT which will assign a new port ID other than port ID=49152 for use with packets from it (the endpoint server 629) that will come directly to the symmetric NAT 1604 from the NAT 1602 rather than by way of the implied relay server. Using the knowledge that $\Delta p=+1$ for the NAT 1604, the browser 630 can predict a possible value of the new port ID.

Because the NAT 1602 is a $SYM_I$ NAT rather than a $SYM_S$ NAT, once it has sent a packet to an address/port pair, the $SYM_I$ NAT 1602 will not assign a new port ID for any other port at the same IP address to which it sends a packet. Hence, the NAT 1602 can send multiple prediction-based BOPs ("p-BOPs") to multiple ports from just one of its own ports, thereby improving the chances of successfully predicting the new port ID. In the example of FIG. 16B, it is assumed that the endpoint server 629 will generate multiple prediction-based BOPs ("p-BOPs").

The endpoint server 629 predicts port IDs and sends corresponding p-BOPs as follows: port ID 49153 over path 1610; port ID 49154 over path 1612; port ID 49155 over path 1614; and port ID 49156 over path 1616. The p-BOPs of paths 1610-1616 are blocked because the symmetric NAT 1604 has not yet sent a packet directly to port 6004 of the NAT 1604. But that does not thwart the purpose of the p-BOPs because a purpose of their being sent is to open the existing port 50012 in the NAT 1602 to packets from the browser 630 sent via the predicted ports of the NAT 1604.

Continuing in terms of the example port IDs, it is assumed that the NAT 1604 assigns port ID 49154 for use with packets coming/going directly between the port-restricted NAT 1602 and the NAT 1604 rather than by way of the implied relay server. Port ID 49154 corresponds to the packet of path 1612, hence door (port ID 60004) at the NAT 1602 is already open to packets originating through port ID 49154 that do not arrive by way of the implied relay server. But the endpoint server 629 does not yet know which of its predictions was successful, i.e., which of the predicted ports 49153-49156 corresponds to the new port.

The browser 630 also would like to send one or more break-out packets ("BOPs") to the endpoint server 629. A purpose of the BOP of path 1612 would be to open the door (port ID=49154) in the symmetric NAT 1604 to packets from the endpoint server 629 that will come directly to the symmetric NAT 1604 from the NAT 1602 rather than by way of the implied relay server. But the browser 630 knows that the NAT 1602 is a symmetric NAT which will assign a new port ID other than port ID=50012 for use with packets from it (the browser 630) that will come directly to the symmetric NAT 1602 from the NAT 1604 rather than by way of the implied relay server. Using the knowledge that Δp=+2 for the NAT 1604, the browser 630 can predict a possible value of the new port ID.

Figure 16C:
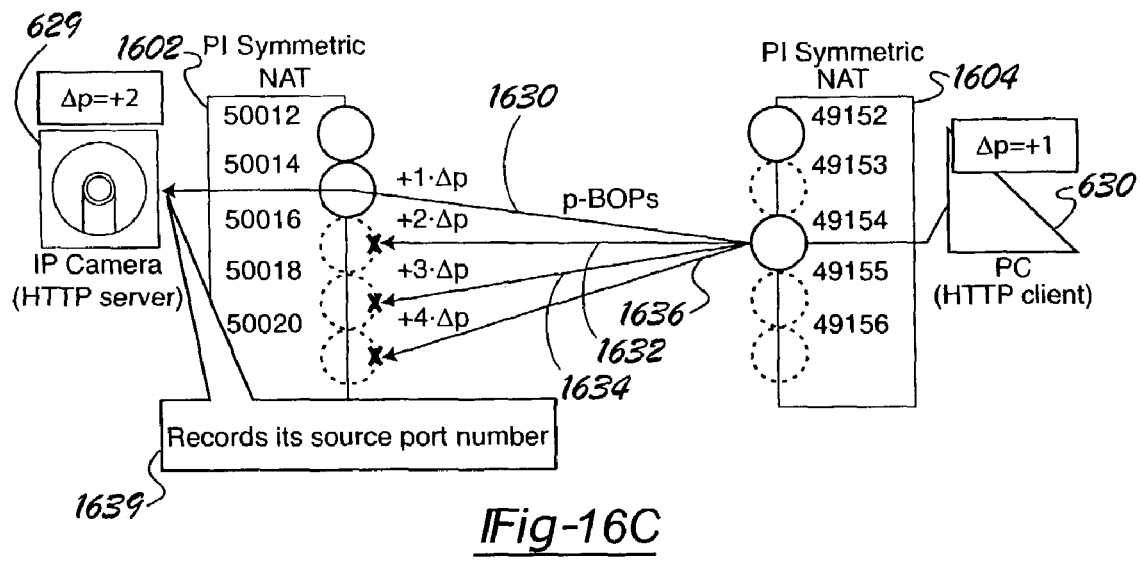
Figure 16D:
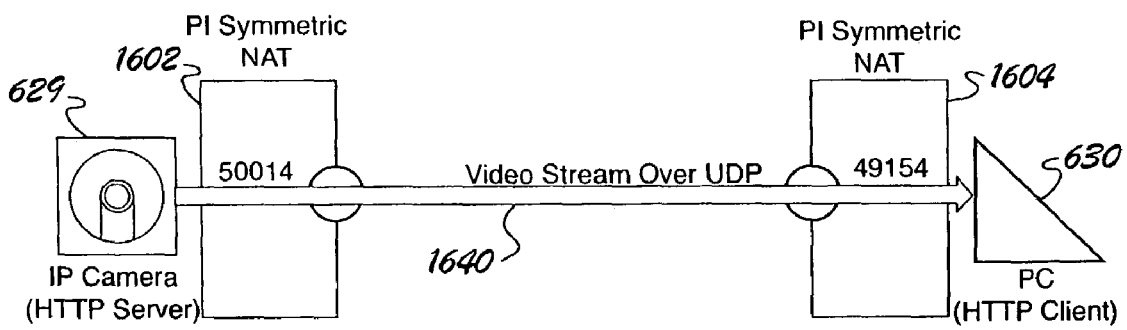

Because the NAT 1604 is a $SYM_I$ NAT rather than a $SYM_S$ NAT, once it has sent a packet to an address/port pair, the $SYM_I$ NAT 1602 will not assign a new port ID for any other port at the same IP address to which it sends a packet. Hence, the NAT 1604 can send multiple prediction-based BOPs ("p-BOPs") to multiple ports from just one of its own ports, thereby improving the chances of successfully predicting the new port ID. In the example of FIG. 16C, it is assumed that the browser 630 will generate multiple prediction-based BOPs ("p-BOPs").

The browser 630 predicts port IDs and sends corresponding p-BOPs as follows: port ID 50014 over path 1630; port ID 50016 over path 1632; port ID 50018 over path 1634; and port ID 50020 over path 1636. The p-BOPs of paths 1630-1636 are blocked because the symmetric NAT 1602 has not yet sent a packet directly to port 49154 of the NAT 1604. But that does not thwart the purpose of the p-BOPs because a purpose of their being sent is to open the port 49154 in the NAT 1604 to packets from the endpoint server 629 sent via the predicted ports of the NAT 1602.

Continuing in terms of the example port IDs, it is assumed that the NAT 1602 assigns port ID 50014 for use with packets coming/going directly between the symmetric NAT 1602 and the symmetric NAT 1604 rather than by way of the implied relay server. Port ID 50014 corresponds to the packet of path 1630, hence door (port ID 49154) at the NAT 1604 is already open to packets originating through port ID 50014 that do not arrive by way of the implied relay server.

Upon receiving the p-BOP of path 1630, the endpoint server 629 records its port ID 49154 (and the IP address) for use in making a P2P connection with the browser 630, as indicated by item 1639. Then, in FIG. 16D, the endpoint server 629 sends a stream of packets (e.g., a video stream where the endpoint server 629 is an IP video camera) over a. UDP type of P2P connection to the browser 630, as indicated by path 1640.

Sub-sub-class $V_{3B}$ will now be discussed in terms of FIGS. 17A-17C.

Figure 17A:
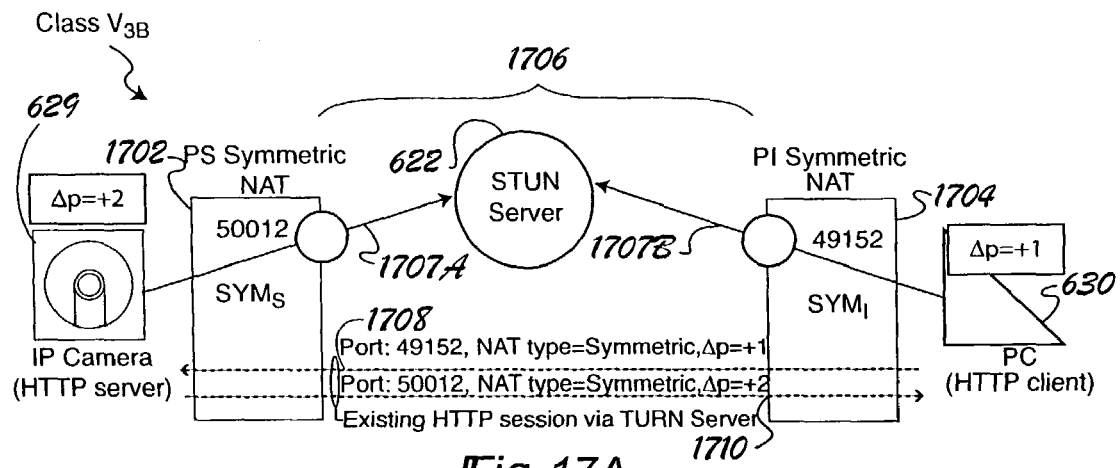
Figure 17B:
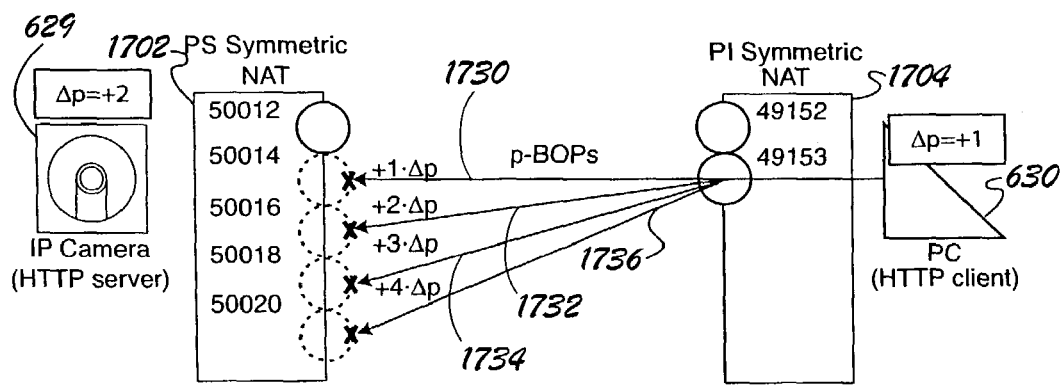
Figure 17C:
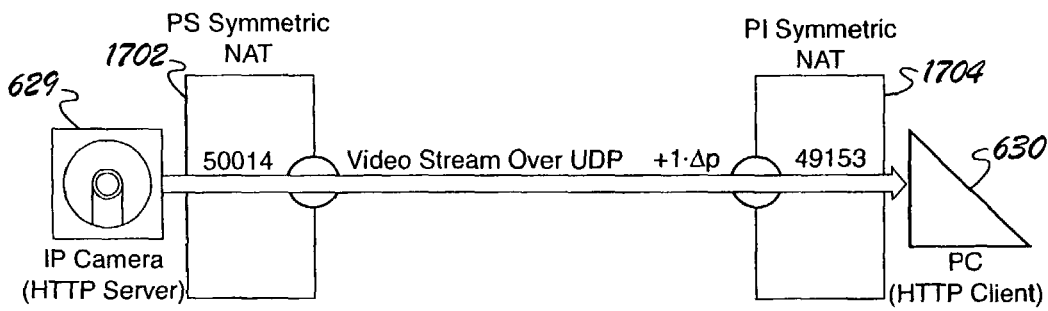

To further the context of the explanation, FIG. 17A assumes that: the endpoint server 629 connects to an IP network 1706 (that includes the implied relay server and the NAT-discovery server 622) via a port-sensitive symmetric ("$SYM_S$") NAT 1702; and the browser 630 connects to the network 1706 via a port-insensitive symmetric ($SYM_I$) NAT 1704. Here, also to further the explanation, example port IDs and a value for Δp are assumed which should not be viewed as limiting the scope of this disclosure.

In FIG. 17A, the endpoint server 629 communicates with the NAT-discovery server 622 (via the NAT 1702) to determine the address/port pair (for example, the port ID is 50012) mapped by the NAT 1702 to the endpoint server 629, what type the NAT 1702 is and the increment size, Δp (here, Δp=+2), as indicated by path 1707A. Similarly, the browser 630 communicates with the NAT-discovery server 622 (via the NAT 1704) to determine the address/port pair (here, the port ID is 49152) mapped by the NAT 1704 to the browser 630 and what type the NAT 1704 is and the increment size, Δp (here, Δp=+1), as indicated by path 1707B.

The endpoint server 629 receives from the browser 630 (via the NAT 1704, the implied relay server and the NAT 1702) information regarding the address/port pair mapped by the NAT 1704 to the browser 630 and what type the NAT 1704 is (including Δp), as indicated by path 1708. The browser 630 receives from the endpoint server 629 (via the NAT 1702, the implied relay server and the NAT 1704) information regarding the address/port pair mapped by the NAT 1702 to the endpoint server 629 and what type the NAT 1702 is, as depicted by path 1710.

Continuing in terms of the example port IDs, it is assumed that the NAT 1704 assigns port ID 49153 for use with packets coming/going directly between the port-restricted NAT 1702 and the NAT 1704 rather than by way of the implied relay server. The browser 630 would like to send one or more break-out packets ("BOPs") to the endpoint server 629. A purpose of the BOP of path 1712 would be to open the door (port ID=49153) in the symmetric NAT 1704 to packets from the endpoint server 629 that will come directly to the symmetric NAT 1704 from the NAT 1702 rather than by way of the implied relay server. But the browser 630 knows that the NAT 1702 is a symmetric NAT which will assign a new port ID other than port ID=50012 for use with packets from it (the browser 630) that will come directly to the symmetric NAT 1702 from the NAT 1704 rather than by way of the implied relay server. Using the knowledge that Δp=+2 for the NAT 1704, the browser 630 can predict a possible value of the new port ID.

Because the NAT 1704 is a $SYM_I$ NAT rather than a $SYM_S$ NAT, once it has sent a packet to an address/port pair, the $SYM_I$ NAT 1702 will not assign a new port ID for any other port at the same IP address to which it sends a packet. Hence, the NAT 1704 can send multiple prediction-based BOPs ("p-BOPs") to multiple ports from just one of its own ports, thereby improving the chances of successfully predicting the new port ID. In the example of FIG. 17C, it is assumed that the browser 630 will generate multiple prediction-based BOPs ("p-BOPs").

The browser 630 predicts port IDs and sends corresponding p-BOPs as follows: port ID 50014 over path 1730; port ID 50016 over path 1732; port ID 50018 over path 1734; and port ID 50020 over path 1736. The p-BOPs of paths 1730-1736 are blocked because the symmetric NAT 1702 has not yet sent a packet directly to port 49154 of the NAT 1704. But that does not thwart the purpose of the p-BOPs because a purpose of their being sent is to open the port 49154 in the NAT 1704 to packets from the endpoint server 629 sent via the predicted ports of the NAT 1702.

Continuing in terms of the example port IDs, it is assumed that the $SYM_S$ NAT 1702 assigns port ID 50014 (=50012+2) for use with packets coming/going directly between the $SYM_S$ NAT 1702 and the $SYM_I$ NAT 1704 rather than by way of the implied relay server. The endpoint server 629 predicts that the port ID on the $SYM_I$ NAT 1704 will be ID=49153 (=49153+1). In FIG. 17D, the endpoint server 629 sends a stream of packets (e.g., a video stream where the endpoint server 629 is an IP video camera) over a UDP type of P2P connection to the browser 630 using predicted port ID=49153, as indicated by path 1740. If the prediction is wrong, then the endpoint server 629 can predict another port ID and resend the stream iteratively until the prediction is successful and the P2P connection is established.

Sub-sub-class $V_{3C}$ will now be discussed in terms of FIGS. 18A-18D.

Figure 18A:
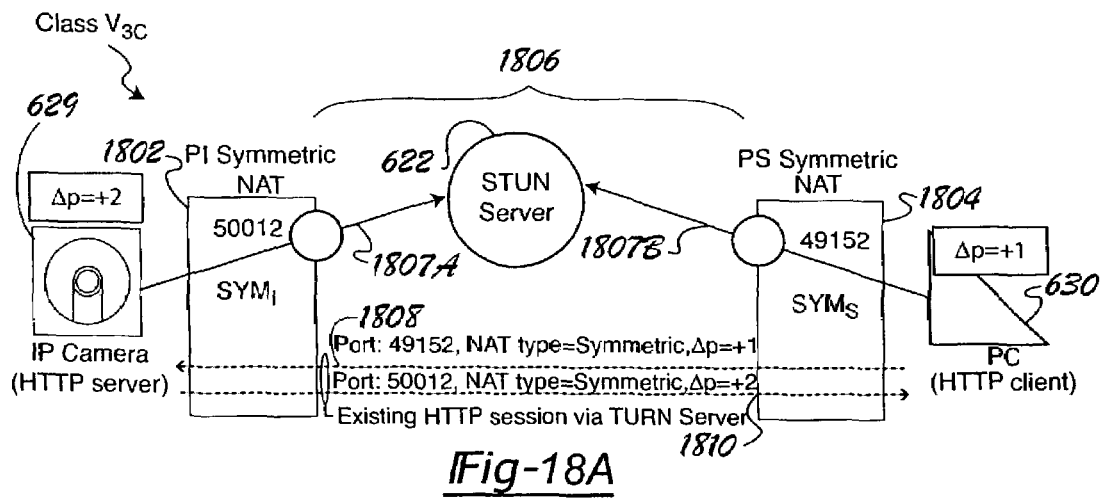

To further the context of the explanation, FIG. 18A assumes that: the endpoint server 629 connects to an IP network 1806 (that includes the implied relay server and the NAT-discovery server 622) via a port-insensitive symmetric (SYMI) NAT 1802; and the browser 630 connects to the network 1806 via a port-sensitive symmetric ("$SYM_S$") NAT 1804. Here, also to further the explanation, example port IDs and a value for Δp are assumed which should not be viewed as limiting the scope of this disclosure.

In FIG. 18A, the endpoint server 629 communicates with the NAT-discovery server 622 (via the NAT 1802) to determine the address/port pair (for example, the port ID is 50012) mapped by the NAT 1802 to the endpoint server 629, what type the NAT 1802 is and the increment size, $\Delta p$ (here, $\Delta p=+2$), as indicated by path 1807A. Similarly, the browser 630 communicates with the NAT-discovery server 622 (via the NAT 1804) to determine the address/port pair (here, the port ID is 49152) mapped by the NAT 1804 to the browser 630 and what type the NAT 1804 is and the increment size, $\Delta p$ (here, $\Delta p=+1$), as indicated by path 1807B.

Figure 18B:
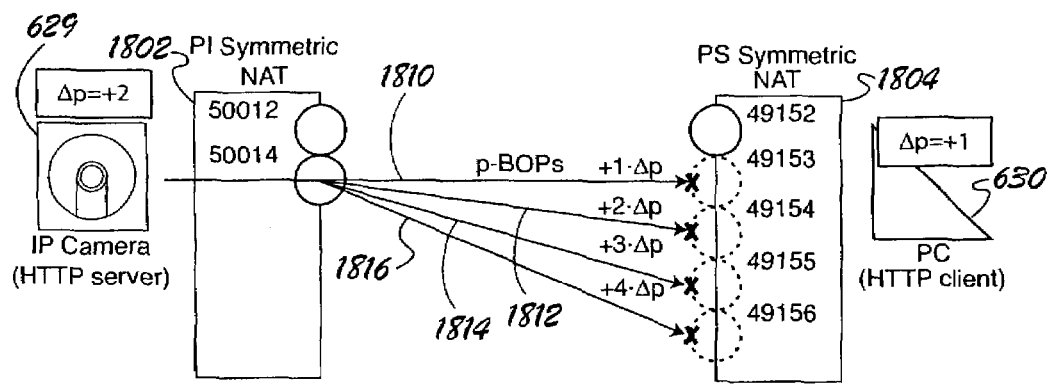

In FIG. 18B, the endpoint server 629 would like to send a break-out packet ("BOP") to the browser 630. A purpose of such a BOP would be to open the door in the $SYM_I$ NAT 1802 to packets from the browser 630 that will come directly to the $SYM_I$ NAT 1802 from the NAT 1804 rather than by way of the implied relay server. But the endpoint server 629 knows that the NAT 1804 is a symmetric NAT which will assign a new port ID other than port ID=49152 for use with packets from it (the endpoint server 629) that will come directly to the symmetric NAT 1804 from the NAT 1802 rather than by way of the implied relay server. Using the knowledge that $\Delta p=+1$ for the NAT 1804, the browser 630 can predict a possible value of the new port ID.

Because the NAT 1802 is a $SYM_I$ NAT rather than a $SYM_S$ NAT, once it has sent a packet to an address/port pair, the $SYM_I$ NAT 1802 will not assign a new port ID for any other port at the same IP address to which it sends a packet. Hence, the NAT 1802 can send multiple prediction-based BOPs ("p-BOPs") to multiple ports from just one of its own ports, thereby improving the chances of successfully predicting the new port ID. In the example of FIG. 18B, it is assumed that the endpoint server 629 will generate multiple prediction-based BOPs ("p-BOPs").

The endpoint server 629 predicts port IDs and sends corresponding p-BOPs as follows: port ID 49153 over path 1810; port ID 49154 over path 1812; port ID 49155 over path 1814; and port ID 49156 over path 1816. The p-BOPs of paths 1810-1816 are blocked because the symmetric NAT 1804 has not yet sent a packet directly to port 50014 of the NAT 1804. But that does not thwart the purpose of the p-BOPs because a purpose of their being sent is to open the existing port 50014 in the NAT 1802 to packets from the browser 630 sent via the predicted ports of the NAT 1804.

Continuing in terms of the example port IDs, it is assumed that the NAT 1804 assigns port ID 49154 for use with packets coming/going directly between the port-restricted NAT 1802 and the NAT 1804 rather than by way of the implied relay server. Port ID 49154 corresponds to the packet of path 1812, hence door (port ID 50014) at the NAT 1802 is already open to packets originating through port ID 49154 that do not arrive by way of the implied relay server. But the endpoint server 629 does not yet know which of its predictions was successful, i.e., which of the predicted ports 49153-49156 corresponds to the new port.

Figure 18C:
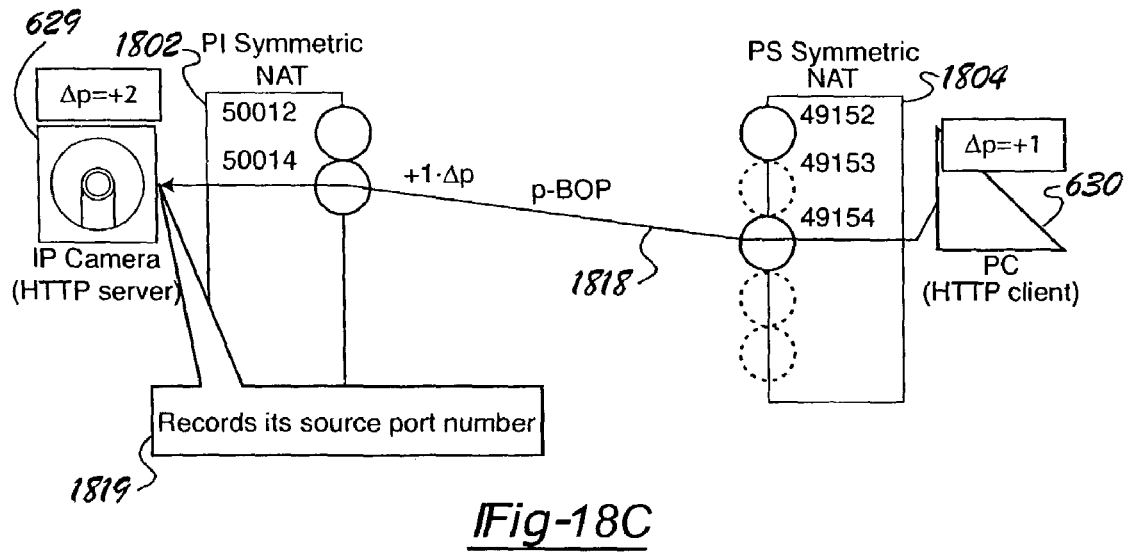
Figure 18D:
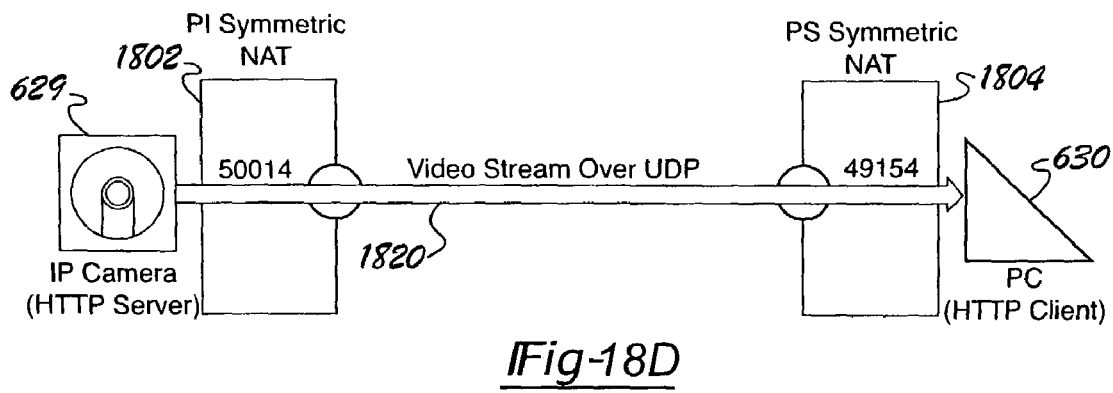

In FIG. 18C, the browser 630 sends a predicted break-out packet ("p-BOP") to the endpoint server 629, as indicated by path 1818. A purpose of the BOP of path 1818 would be to open the door (port ID 49154) in the $SYM_S$ NAT 1804 to packets from the endpoint server 629 that will come directly to the $SYM_S$ NAT 1804 from the $SYM_I$ NAT 1802 rather than by way of the implied relay server.

Upon receiving the p-BOP of path 1818, the endpoint server 629 records its port ID 49154 (and the IP address) for use in making a P2P connection with the browser 630, as indicated by item 1819. Then, in FIG. 18D, the endpoint server 629 sends a stream of packets (e.g., a video stream where the endpoint server 629 is an IP video camera) over a UDP type of P2P connection to the browser 630, as indicated by path 1820.

Sub-sub-class $V_{3D}$ will now be discussed in terms of FIGS. 19A-19C.

Figure 19A:
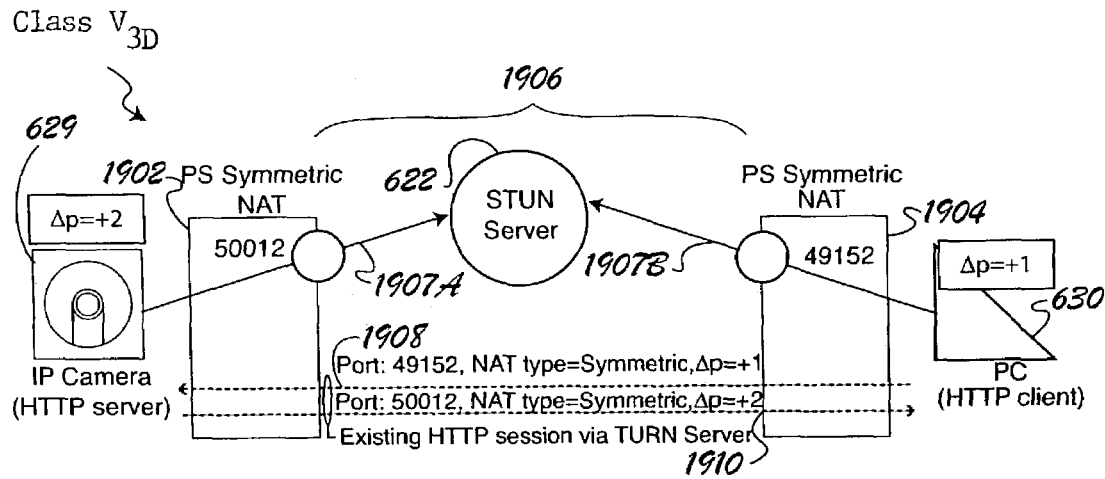

To further the context of the explanation, FIG. 19A assumes that: the endpoint server 629 connects to an IP network 1906 (that includes the implied relay server and the NAT-discovery server 622) via a port-sensitive symmetric ("$SYM_S$") NAT 1902; and the browser 630 connects to the network 1906 also vial a $SYM_S$ NAT 1904. Here, also to further the explanation, example port IDs and a value for $\Delta p$ are assumed which should not be viewed as limiting the scope of this disclosure.

In FIG. 19A, the endpoint server 629 communicates with the NAT-discovery server 622 (via the NAT 1902) to determine the address/port pair (for example, the port ID is 50012) mapped by the NAT 1902 to the endpoint server 629, what type the NAT 1902 is and the increment size, $\Delta p$ (here, $\Delta p=+2$), as indicated by path 1907A. Similarly, the browser 630 communicates with the NAT-discovery server 622 (via the NAT 1904) to determine the address/port pair (here, the port ID is 49152) mapped by the NAT 1904 to the browser 630 and what type the NAT 1904 is and the increment size, $\Delta p$ (here, $\Delta p=+1$), as indicated by path 1907B.

Figure 19B:
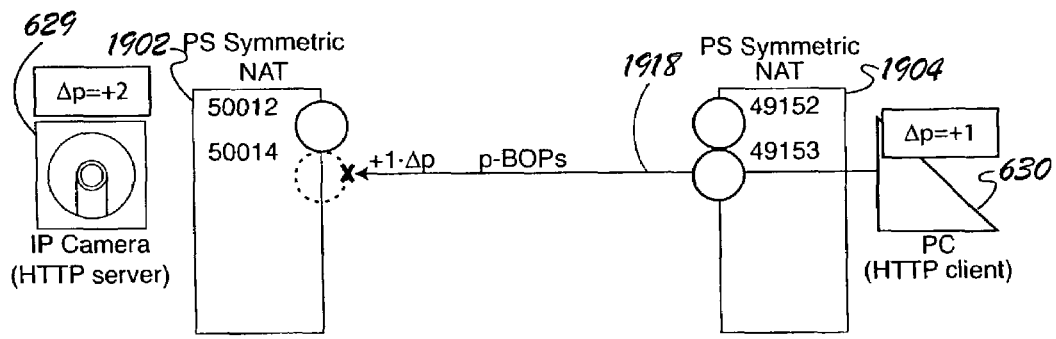
Figure 19C:
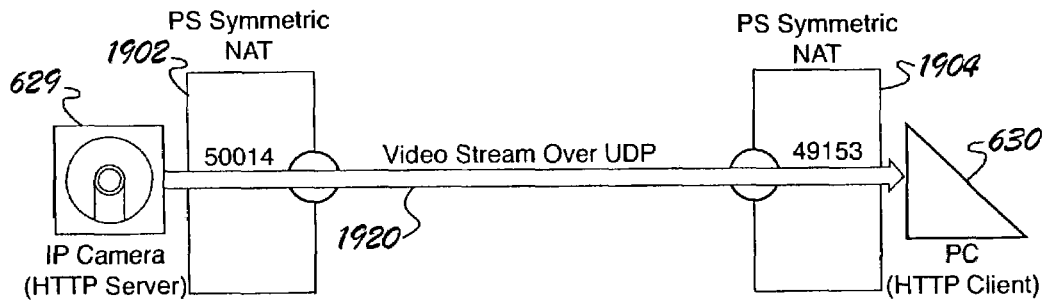

In FIG. 19B, the browser 630 sends a predicted break-out packet ("p-BOP") to the endpoint server 629, as indicated by path 1918. A purpose of the BOP of path 1918 would be to open the door (port ID 49153) in the $SYM_S$ NAT 1904 to packets from the endpoint server 629 that will come directly to the $SYM_S$ NAT 1904 from the $SYM_S$ NAT 1902 rather than by way of the implied relay server.

Using the knowledge that $\Delta p=+2$ for the NAT 1904, the browser 630 can predict a possible value of the new port ID.

The browser 630 predicts the port ID to be ID=50014 sends corresponding p-BOP over path 1918. The p-BOP of paths 1918 is blocked because the symmetric NAT 1902 has not yet sent a packet directly to port 49154 of the $SYM_S$ NAT 1904. But that does not thwart the purpose of the p-BOP because a purpose of it being sent is to open the port 49153 in the $SYM_S$ NAT 1904 to packets from the endpoint server 629 sent via the predicted port of the $SYM_S$ NAT 1902.

Continuing in terms of the example port IDs, it is assumed that the $SYM_S$ NAT 1902 actually does assign port ID 50014 (=50012+2) for use with packets coming/going directly between the $SYM_S$ NAT 1902 and the $SYM_I$ NAT 1904 rather than by way of the implied relay server. The endpoint server 629 predicts that the port ID on the $SYM_I$ NAT 1904 will be ID=49153 (=49153+1). In FIG. 19C, the endpoint server 629 sends a stream of packets (e.g., a video stream where the endpoint server 629 is an IP video camera) over a UDP type of P2P connection to the browser 630 using predicted port ID=49153, as indicated by path 1920. If the prediction is wrong, then the endpoint server 629 can repeat the process, starting with the paths 1907A, 1907B, etc., albeit including the following differences: the endpoint server 629 and the browser 630 can cause the respective NATs to make new bindings by communicating to the NAT-discovery server 622 using different source port IDs, respectively.

According to another embodiment of the invention, an extension to the Session Description Protocol ("SDP"), namely a new attribute, is provided by which information as to the type of a NAT can be exchanged. Alternatively, techniques other than an SDP-message can be used to exchange NAT-type information.

SDP is suitable for use with HTTP because, e.g., SDP is text-based and/or because it is commonly used as a voice-over-IP protocol. Over HTTP, an SDP message having NAT-type information can be sent as some or all of the content/body of a request (e.g., using HTTP's POST method) and a response (e.g., using HTTP's message 200 OK) message.

Such an SDP NAT-type attribute can be as follows.
Content-Type: application/sdp
Use a=field: (ex. a=<attribute>:<value>)
Attribute name: nat
Attribute value (see following table):

| Open | OPEN (default) |
|---|---|
| Full-cone NAT | F |
| Address-restricted cone NAT | R |
| Port-restricted-cone NAT | PR |
| Port-sensitive Symmetric NAT | SYM |
| Port-INsensitive Symmetric NAT | SYMI |
| UDP_BLOCKED | UB |

The following is an example SDP-message that can be used to exchange NAT-type information. This example will treat the characters, //, and every subsequent character encountered until the end of a line as a comment, i.e., as not being part of the SDP message.

| | |
|---|---|
| POST/P2PRequest HTTP/1.1 | //HTTP header, request line |
| Content-Type: application/sdp | //HTTP header, attribute line |
| Content-Length: 89 | ///HTTP header, attribute line |
| | //Intentional SDP Blank line |
| v = 0 | //Version number of SDP |
| s = P2P Viewer | //Name of browser |
| c = IN IP4 67.105.5.125 | //IPV4 scheme, browser's //address |
| a = recvonly | //browser receive only not also //send |
| m = video 61003 RTP/AVP 26 | //forthcoming P2P content //(media) |
| a = nat:F | //Specific example of extension //to SDP according to an //embodiment of the invention, //here NAT type is full cone (F) |

In the case that the NAT is a symmetric NAT, the attribute value will have a second field in addition-to the type field (e.g., for a symmetric NAT, the type field will be "SYM" or "SYMI"). The second field represents the value of the increment size ($\Delta p$). As an example, a $SYM_I$ NAT having $\Delta p=+2$ can be represented as: a=nat:SYMI 2. As another example, a $SYM_S$ NAT having $\Delta p=+1$ can be represented as: a=nat:SYM 1.

FIG. 20 depicts a table that organizes actions, according to an embodiment of the invention, which can be taken toward establishing a P2P connection between a first endpoint device and a second endpoint device after these devices have exchanged NAT-mapped address and NAT-type information via a relay-server-based connection, depending upon the class (I, II, III, IV and $V_1$, $V_2$, $V_{3A}$, $V_{3B}$, $V_{3C}$ and $V_{3D}$) of NAT-combination. As in the explanations above, the first endpoint device can be, e.g., an endpoint server such as 629, and the second endpoint device can be, e.g., a browser such as 630. In FIG. 20, the legend "SR" indicates source port recording. There, the endpoint server can record the source port number of an incoming packet to be used as a destination port to send UDP packets.

Figure 21:
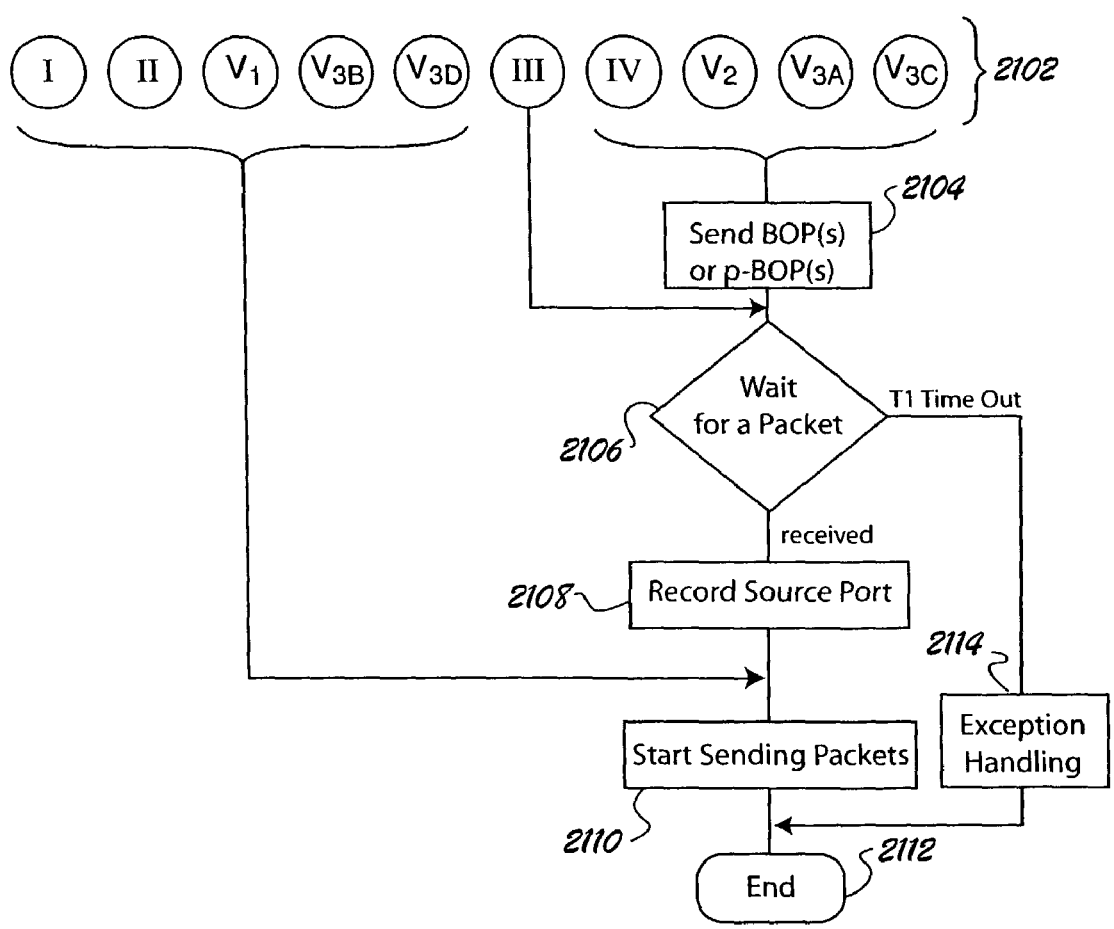
FIG. 21 is a flowchart, related to the table of FIG. 20, depicting actions relative to the classes and subclasses described in FIG. 5B that can be taken by an endpoint device, e.g., an endpoint server, according to embodiments of the invention.

FIG. 21 is a flowchart, related to the table of FIG. 20, depicting actions that can be taken by the first endpoint device, e.g., (again), an endpoint server such as 629, according to embodiments of the invention. The various classes (I, II, III, IV and $V_1$, $V_2$, $V_{3A}$, $V_{3B}$, $V_{3C}$ and $V_{3D}$) of NAT-combination, indicated generally at item 2102, enter the flowchart of FIG. 21 at different locations. Classes IV, $V_2$, $V_{3A}$, and $V_{3C}$ enter box 2104, where the first endpoint device sends one or more BOPs and/or p-BOPs. For classes $V_2$, $V_{3A}$, $V_{3B}$, $V_{3C}$ and $V_{3D}$, the first endpoint device might send multiple p-BOPs to destinations predicted using the increment size ($\Delta p$) of the second endpoint device's NAT.

Flow moves in FIG. 21 from box 2104 to decision box 2106, where the first endpoint device waits to receive a packet from the second endpoint device. It is noted that class III enters the flowchart by entering decision box 2106. If a packet is received by the first endpoint device, then flow moves from box 2106 to box 2108, where the first endpoint device records the packet's source port (and IP address).

Flow moves further in FIG. 21 from box 2108 to box 2110, where the first endpoint device sends a stream of packets over a UDP type of P2P connection. It is noted that classes I, II, $V_1$, $V_{3B}$, and $V_{3D}$ enter the flowchart by entering decision box 2104. After the P2P connection is finished, flow moves from box 2110 to box 2112, where flow ends. If a packet is not received by the first endpoint device after waiting a predetermined time, T1 (e.g., T1=10 seconds), a failure/exception is considered to have occurred and flow moves from box 2106 to box 2114, where the first endpoint device carries out appropriate exception/failure procedures. Flow moves from box 2114 to box 2112.

Figure 22:
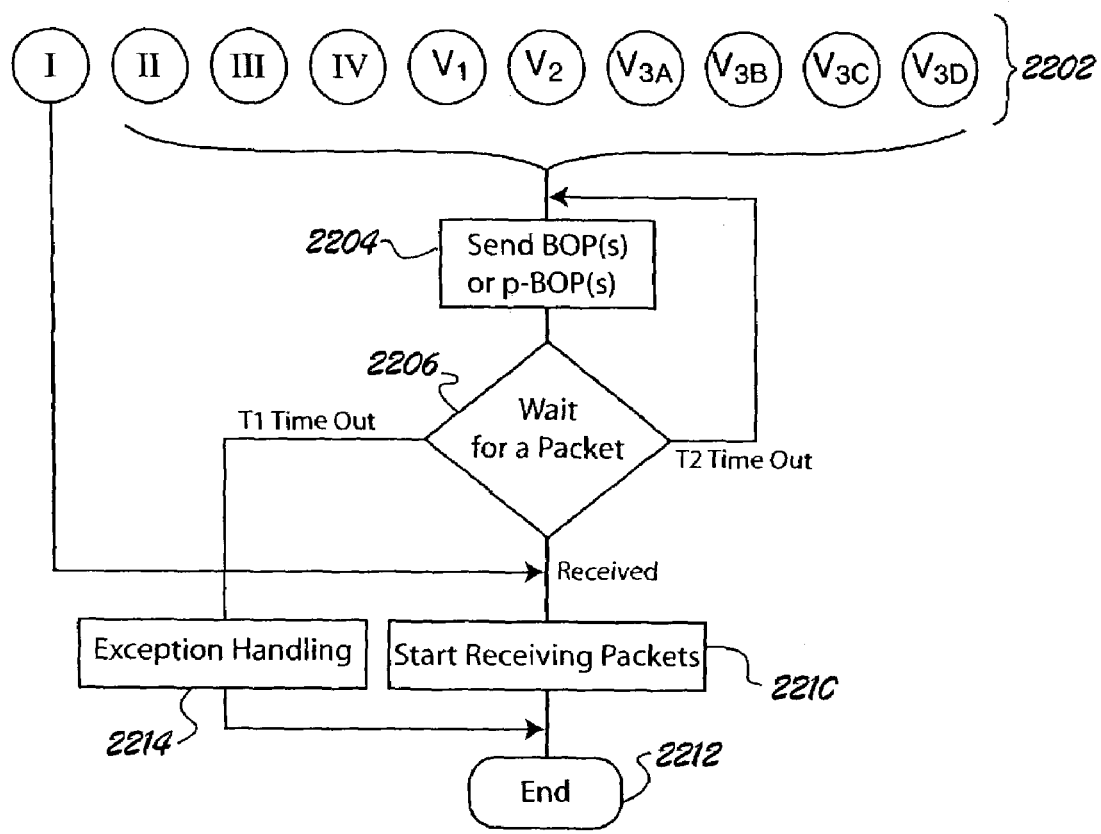
FIG. 22 is a flowchart, related to the table of FIG. 20, depicting actions relative to the classes and subclasses described in FIG. 5B that can be taken by an endpoint device, e.g., a browser, according to embodiments of the invention.

FIG. 22 is a flowchart, related to the table of FIG. 20 (and the flowchart of FIG. 21), depicting actions that can be taken by the second endpoint device, e.g., (again), a browser such as 630, according to another embodiment of the invention. The various classes (I, II, III, IV and $V_1$, $V_2$, $V_{3A}$, $V_{3B}$, $V_{3C}$ and $V_{3D}$) of NAT-combination, indicated generally item at 2202, enter the flowchart of FIG. 22 at different locations. Classes I, II, III, IV and V1, V2, V3A, V3B, V3C and V3D (i.e., all except class I) enter box 2204, where the second endpoint device sends one or more BOPs and/or p-BOPs. For classes $V_2$, $V_{3A}$ or $V_{3B}$, the second endpoint device might send multiple p-BOPs to destinations predicted using the increment size ($\Delta p$) of the first endpoint device's NAT.

Flow moves from box 2204 to decision box 2206, where the second endpoint device waits to receive a packet from the first endpoint device. If a packet is received by the second endpoint device, then flow in FIG. 22 moves from box 2206 to box 2210, where the second endpoint device attempts receives a stream of packets over a UDP type of P2P connection. It is noted that class I enters the flowchart by entering decision box 2210. After the P2P connection is finished, flow moves from box 2210 to box 2212, where flow ends.

In FIG. 22, if a packet is not received by the second endpoint device after waiting a predetermined time, T2 (e.g., T2=10 milliseconds), flow moves or loops from box 2206 back to box 2204. If a packet is not received by the second endpoint device after waiting a concurrently-elapsing predetermined time, T1 (e.g., T1=10 seconds), a failure/exception is considered to have occurred and flow moves from box 2206 to box 2214, where the second endpoint device carries out appropriate exception/failure procedures. Flow moves from box 2214 to box 2212.

Figure 3:
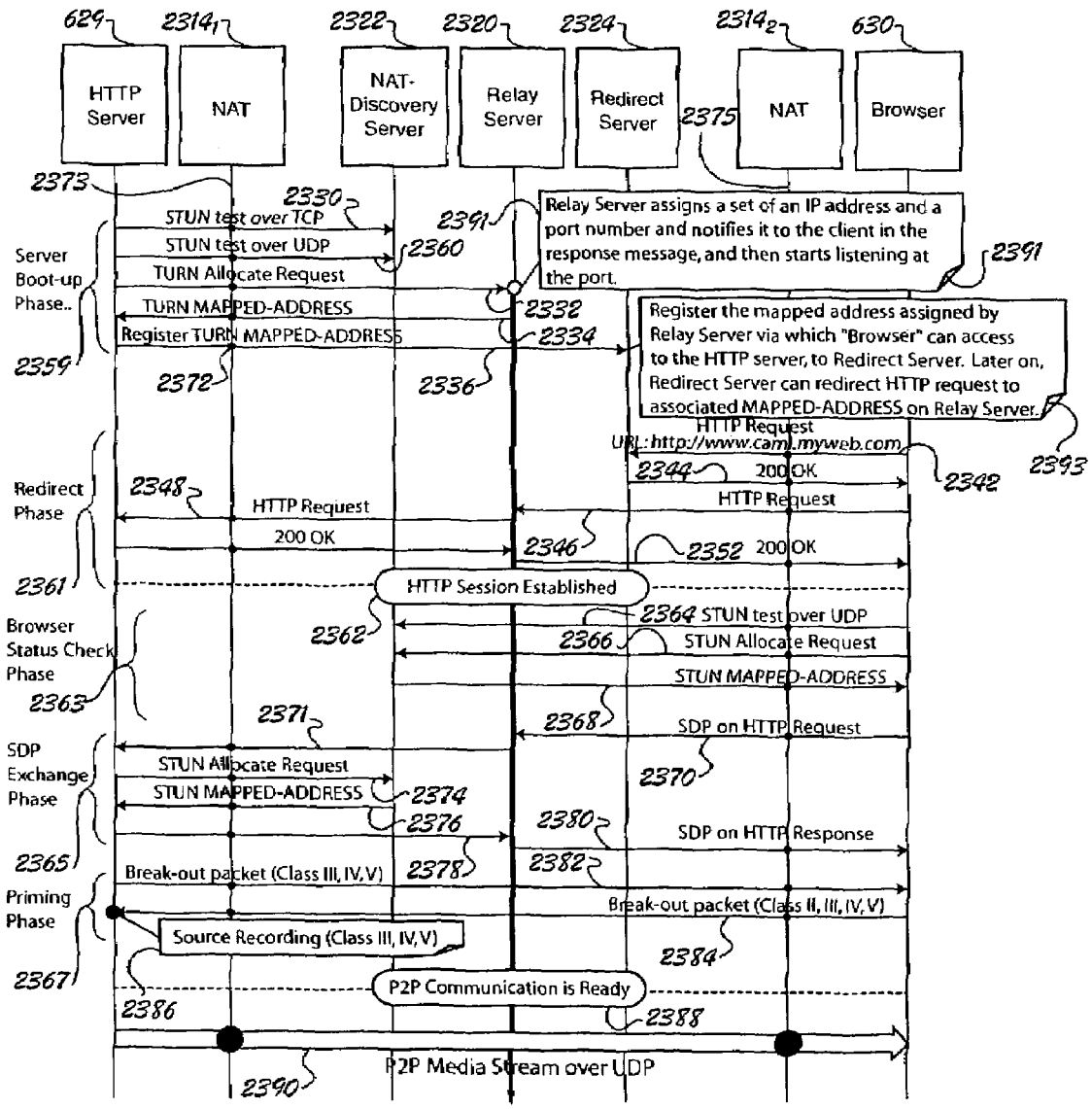
FIG. 3 is a sequence diagram of operations by which a P2P connection can be facilitated according to embodiments of the invention.

FIG. 3 is a sequence diagram of operations by which a P2P connection can be facilitated according to embodiments of the invention. FIG. 23 does not strictly conform to the conventions of UML-type sequence diagrams. FIG. 3 is similar to FIG. 2 in that it includes: an endpoint server 629; a first NAT 2314$_1$ corresponding to 14$_1$; a NAT-discovery server 2322 corresponding to 22; a packet relay server 2320 corresponding to 20; a redirect server 2324 corresponding to 24; a second NAT 2314$_2$ corresponding to 14$_2$; and a browser 630. The endpoint server 629 and the browser 630, again, are examples of endpoint devices; other types of endpoint devices can be used.

Further, FIG. 3 is similar to FIG. 2 in its sequence of messages up through a point at which the packet-relay-based connection is established, as indicated by item 2362. As such, messages 2330, 2332, 2334, 2336, 2342, 2344, 2346, 2348, 2350 and 2352 of FIG. 3 correspond to messages 30, 32, 34, 36, 42, 44, 46, 48, 50 and 52 of FIG. 2, respectively, and will be described further, if at all, merely with brief comments, for the sake of brevity. Comments, as indicated by items 2391 and 2393, have been listed in FIG. 3 for messages 2332 and 2336, respectively. Messages corresponding to 38 and 40 can take place in FIG. 3, but are not depicted for brevity. The intervening roles of the NATs 2314$_1$ and 2314$_2$ are indicated by the dots 72 at the intersections of messages and the lifelines 2373 and 2375.

Messages 2330, 2332, 2334 and 2336 can be described as occurring during a boot-up phase (as indicated by item 2359) of the endpoint server 629. An additional message 2360 is sent by the endpoint server 629 during the boot-up phase 2359, namely message 2360 sent after message 2330 but before message 2332. Message 2360 is a NAT-discovery-over-UDP test initiated by the endpoint server 629 to determine information about what type the NAT 2314$_1$ is and to gather data by which the endpoint server 629 can determine the value of the increment size ($\Delta$p) of the NAT 2314$_1$.

Messages 2342, 2344, 2346, 2348, 2350 and 2352 can be described as occurring during a redirect phase (as indicated by item 2361). Message 2342, as an example, assumes URL:http:H/www.cam1.mweb.com as an address mapped by the NAT 2314$_1$ to the endpoint server 629. Messages 2344, 2350 and 2352 each, as an example, assumes a response that includes the HTTP message "200 OK". The HTTP session between the endpoint server 629 and the browser 630 via the relay server 2320 as intermediary becomes established after message 2352.

FIG. 3 further includes the following phases: a browser-status-check phase (as indicated by item 2363) which the browser 630 undergoes, corresponding to messages 2364, 2366 and 2368; an SDP-message-exchange phase (as indicated by item 2365) including messages 2370, 2371, 2374, 2376, 2378 and 2389; and a priming phase (as indicated by item 2367) including messages 2382 and 2384. After the priming phase 2367, the endpoint server 629 and the browser 630 are ready to make a P2P connection, as indicated by item 2388.

The browser-status-check phase 2363 will now be described in more detail. After receiving the message 2352, the browser 630 sends a message 2364, which is a NAT-discovery-over-UDP test to determine information about what type the NAT 2314$_2$ is and to gather data by which the endpoint server 629 can determine the value of the increment size ($\Delta$p) of the NAT 2314$_2$. Message 2364 corresponds to message 2360. A typical browser 630 does not have the capability to perform a NAT-discovery-over-UDP test. Such capability can be added to the browser 630 via a plug-in module, an active-X control, an applet, etc. provided to the browser 630, e.g., as an additional part of the messages 2350 and 2352.

Then, the browser 630 sends message 2366, e.g., a STUN allocate request, by which the browser 630 requests the port allocated/mapped to it (the browser 630) by the NAT 2314$_2$ for a forthcoming P2P connection with the endpoint server 629. The NAT-discovery server 2322 responds in the form of message 2368, e.g., a STUN Mapped-Address indicating at least a port ID if not an address/port pair.

The SDP-message-exchange phase 2365 will now be described in more detail. After message 2368, the browser 630 sends message 2370, e.g., an SDP on HTTP message, to the endpoint server 629 via the relay server 2320, which relays message 2370 as message 2371 to the endpoint server 629. Aspects of the messages 2370 and 2371 can include: an indication that browser 630 wants to set-up a P2P connection; an indication of what type the NAT 2314$_2$ is; and an indication of what is the value of the increment size ($\Delta$p), e.g., using the NAT-type attribute extension to SDP discussed above. For example, the sample SDP-type message discussed above, namely "POST/P2PRequest HTTP/1.1 . . . ", uses the "POST" method available in SDP to convey information. Among other things, the text string "P2PRequest" (in the field known as the "requested URI" field) indicates that the browser 630 (as the sender of the message) wants to set-up a P2P connection with the recipient of the message, namely the endpoint server 629. Other SDP methods could be used to convey such information.

The endpoint server 629 responds by sending message 2374, e.g., a STUN allocate request, by which the endpoint server 629 requests the port allocated/mapped to it (the browser 630) by the NAT 2314$_2$ for a forthcoming P2P connection with the browser 630. The NAT-discovery server 2322 responds in the form of message 2376, e.g., a STUN Mapped-Address indicating at least a port ID if not an address/port pair. The endpoint server 629 sends message 2378, e.g., an SDP on HTTP message, to the browser 630 via the relay server 2320, which relays message 2378 as message 2380 to the endpoint server 629. The messages 2378 and 2380, similar to messages 2370 and 2371, indicate what type the NAT 2314$_1$ is as well as what is the value of the increment size ($\Delta$p), e.g., using the NAT-type attribute extension to SDP discussed above.

It is noted that the SDP exchange phase can be carried out in ways other than the messages 2370-2389. Alternatively, the NAT-type information, etc., can be exchanged between the browser 630 and the endpoint server 629 via the existing relay-server-based HTTP session, a separate MODEM-supported communication channel,; a wireless connection, a ping-pong Gnutella-type-protocol session, etc.

The priming phase 2367 will now be described in more detail. If the characteristics of the two NATs 2314$_1$ and 2314$_2$ correspond to one of classes III, IV or V, then the endpoint server 629 sends one or more BOPs or p-BOPs to the browser 630. Then, if the characteristics of the two NATs 2314$_1$ and 2314$_2$ correspond to one of classes II, III, IV or V, the browser 630 sends one or more BOPs or p-BOPs to endpoint server 629. And if the characteristics of the two NATs 2314$_1$ and 2314$_2$ correspond to one of classes III, IV or V, then the endpoint server 629 also records the port ID allocated/mapped by the NAT 2314$_2$ to the browser 630 for the forthcoming P2P connection, as indicated by note 2386. It is noted that a trigger for causing the endpoint server 629 to send one or more BOPs can be the P2P request included in message 2371/2370. Similarly, a trigger for the browser 630 to send one or more BOPs can be the message 2378/2380 that responds to the P2P request.

After message 2384 and (in some cases) the source port recording 2386, the endpoint server 629 and the browser 630 are ready to establish a P2P connection. As indicated by message 2390, the endpoint server 629 then sends a stream of packets (e.g., a video stream where the endpoint server 629 is an IP video camera) over a UDP type of P2P connection to the browser 630.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A computer-readable storage medium having code portions embodied thereon that are readable by a first endpoint device (ED), the first ED being usable with a system compliant with the internet protocol (IP), the system having an architecture that includes a first network, a second network and a third network, the first network having at least the first ED and a first network address translator (NAT), the first ED being connected to the third network via the first NAT, the first NAT allocating a first pair of an IP address and port number for communication from the third-network-side of the first NAT with the first ED via the first NAT, the second network having at least a second ED and a second NAT, the second ED being connected to the third network via the second NAT, the second NAT allocating a second IP address and port pair for communication from the third-network-side of the second NAT with the second ED via the second NAT, the code portions embodied on the computer-readable storage medium, when read by the first ED, causing the first ED to perform the steps of:

(a) request the second NAT to map a plurality of port identification numbers (IDs), receive information regarding the plurality of ports, including the plurality of port IDs, and determine a port increment size ($\Delta p$) of the second NAT based on said information; or (b) receiving an indication of port increment size ($\Delta p$) used by the second NAT to allocate and map new port numbers, and predict, based upon the indication of port increment size ($\Delta p$), at least one predicted destination port identification number (ID) that would be used by the second NAT for a peer-to-peer (P2P) connection between the first ED and the second ED, wherein the ID is predicted before assignment by the second NAT of the port ID, thereby making the first ED operable to facilitate the peer-to-peer (P2P) connection between the first ED and the second ED, despite the intervening first and second NATs at both ends of the connection.

2. A system for effecting communication between an endpoint device associated with a first network and a client associated with a second network, comprising:

a symmetric network address translator (NAT) coupled between said first and second networks and being configured to map first address and port pairs associated with said first network to second address and port pairs associated with said second network;

said symmetric NAT being configured to uniquely map one first address and port pair with one and only one second address and port pair;

said endpoint device having a map request component adapted to communicate with said symmetric NAT to obtain a set of port mappings previously made by said symmetric NAT between said first and second address and port pairs;

said endpoint device further having a prediction component that examines said set of port mappings received and computes a predicted port mapping with which communication between said endpoint device and said client is effected through said symmetric NAT based upon an indication of port increment size ($\Delta p$).

3. A peer-to-peer system for effecting communication between a first peer associated with a first network and a second peer associated with a second network, comprising:

a symmetric network address translator (NAT) coupled between said first and second networks and being configured to map first address and port pairs associated with said first network to second address and port pairs associated with said second network;

said symmetric NAT being configured to uniquely map one first address and port pair with one and only one second address and port pair;

said first peer having a map request component adapted to communicate with said symmetric NAT to obtain a set of port mappings previously made by said symmetric NAT between said first and second address and port pairs;

said first peer further having a prediction component that examines said set of port mappings received and computes a predicted port mapping with which communication between said first and second peers is effected through said symmetric NAT based upon an indication of port increment size ($\Delta p$).

* * * * *